(12) United States Patent
Nguyen et al.

(10) Patent No.: US 10,768,328 B2
(45) Date of Patent: Sep. 8, 2020

(54) SEISMIC NOISE ATTENUATION USING DIP MAP DATA STRUCTURE

(71) Applicant: PGS Geophysical AS, Oslo (NO)

(72) Inventors: Truong Nguyen, Thames Ditton (GB); Richard Dyer, Guildford (GB)

(73) Assignee: PGS Geophysical AS, Oslo (NO)

( * ) Notice: Subject to any disclaimer, the term of this patent is extended or adjusted under 35 U.S.C. 154(b) by 251 days.

(21) Appl. No.: 15/865,337

(22) Filed: Jan. 9, 2018

(65) Prior Publication Data

US 2018/0196155 A1 Jul. 12, 2018

Related U.S. Application Data

(60) Provisional application No. 62/445,573, filed on Jan. 12, 2017.

(51) Int. Cl.
*G01V 1/36* (2006.01)
*G01V 1/28* (2006.01)
*G01V 1/38* (2006.01)

(52) U.S. Cl.
CPC .............. *G01V 1/364* (2013.01); *G01V 1/282* (2013.01); *G01V 1/38* (2013.01); *G01V 2210/1293* (2013.01); *G01V 2210/1423* (2013.01); *G01V 2210/324* (2013.01)

(58) Field of Classification Search
CPC .......... G01V 1/364; G01V 1/282; G01V 1/38; G01V 2210/1423; G01V 2210/1293; G01V 2210/324
See application file for complete search history.

(56) References Cited

U.S. PATENT DOCUMENTS

| | | | |
|---|---|---|---|
| 9,269,127 B2* | 2/2016 | Ding | G06T 5/50 |
| 2011/0147004 A1* | 6/2011 | Neelamani | G01V 1/36 |
| | | | 166/369 |
| 2013/0028525 A1* | 1/2013 | Schoenblum | G06T 5/002 |
| | | | 382/199 |
| 2014/0219552 A1* | 8/2014 | Porikli | G06T 5/002 |
| | | | 382/155 |

(Continued)

OTHER PUBLICATIONS

M.S. Oliveira, et al., "Seismic denoising using curvelet analysis," Elsevier B.V., Physica A 391, 2012, pp. 2106-2110.

(Continued)

*Primary Examiner* — Mohamed Charioui

(57) ABSTRACT

Techniques are disclosed relating to reducing noise in geophysical marine survey data through use of a dip map data structure. Such techniques may include adapting a model of multiple noise to seismic data. A multiple dip map may be generated by convolving the adapted model of multiple noise with a set of directional filters. A modified record of the seismic data may be generated through adaptive subtraction that is sufficient to remove most multiple events but may also damage at least some primary events. A primary dip map may then be determined from the modified record by interpolation dependent on the multiple dip map. A noise template may then be adaptively subtracted from the seismic data. Prior to the adaptive subtraction, the noise template is adapted to the seismic data by a degree of adaptation that is determined dependent upon relative amplitudes of the primary and multiple dip maps.

27 Claims, 14 Drawing Sheets

(56) References Cited

U.S. PATENT DOCUMENTS

2014/0365135 A1* 12/2014 Poole ................. G01V 1/36
702/17

OTHER PUBLICATIONS

Neelamani, et al., "Coherent and random noise attenuation using the curvelet transform," The Leading Edge, Feb. 2008, pp. 240-248.
Neelamani, et al., "Adaptive subtraction using complex-valued curvelet transforms," Geophysics, vol. 75, No. 4, Jul.-Aug. 2010; pp. V51-V60.
Perrier, et al., "Intelligent Adaptive Subtraction for Multiple Attenuation," 79th EAGE Conference & Exhibition 2017 Paris Jun. 12-15, 2017, 5 pages.
Nguyen, et al., "Adaptive multiple subtraction by statistical curvelet matching," SEG International Exposition and 86th Annual Meeting, 2016, pp. 4566-4571.
Nguyen, et al., "Uniform Discrete Curvelet Transform," submitted for publication in IEEE Transaction on Signal Processing, Oct. 2009, 18 pages.
Emmanuel Candes et al., "Fast Discrete Curvelet Transforms*," 2006 Society for Industrial and Applied Mathematics; Multiscale Model. Simul; vol. 5, No. 3, pp. 861-899.
Lexing Ying et al., "3D Discrete Curvelet Transform," Proc. SPIE 5914, Wavelets XI, 591413 (Sep. 17, 2005), 11 pages.

* cited by examiner

SEISMIC NOISE ATTENUATION USING DIP MAP DATA STRUCTURE

CROSS-REFERENCE TO RELATED APPLICATIONS

This application claims priority to U.S. Provisional Patent Application No. 62/445,573, filed on Jan. 12, 2017, which is hereby incorporated by reference in its entirety.

BACKGROUND

Geophysical surveys are often used for oil and gas exploration in geophysical formations, which may be located below marine environments. Various types of signal sources and geophysical sensors may be used in different types of geophysical surveys. Seismic geophysical surveys, for example, are based on the use of seismic waves. Electromagnetic geophysical surveys, as another example, are based on the use of electromagnetic waves. In some surveys, a survey vessel may tow one or more sources (e.g., air guns, marine vibrators, electromagnetic sources, etc.) and one or more streamers along which a number of sensors (e.g., hydrophones and/or geophones and/or electromagnetic sensors) are located.

During the course of a geophysical survey, the various sensors may collect data indicative of geological structures, which may be analyzed, e.g., to determine the possible locations of hydrocarbon deposits. However, the data may be contaminated by various sources of noise that may complicate the data analysis. In some cases, the expected noise may be modeled and applied to the data as part of a noise-reduction process. Because the noise model may be imperfect, it may be adapted before being applied to the data, e.g., to better fit the general noise model to the particular circumstances in which the survey occurred.

Various challenges may arise in choosing how to adapt a noise model in order to achieve an effective level of noise reduction. Embodiments of this disclosure may be used to address some of these challenges, as discussed below.

DETAILED DESCRIPTION

Figure 1:
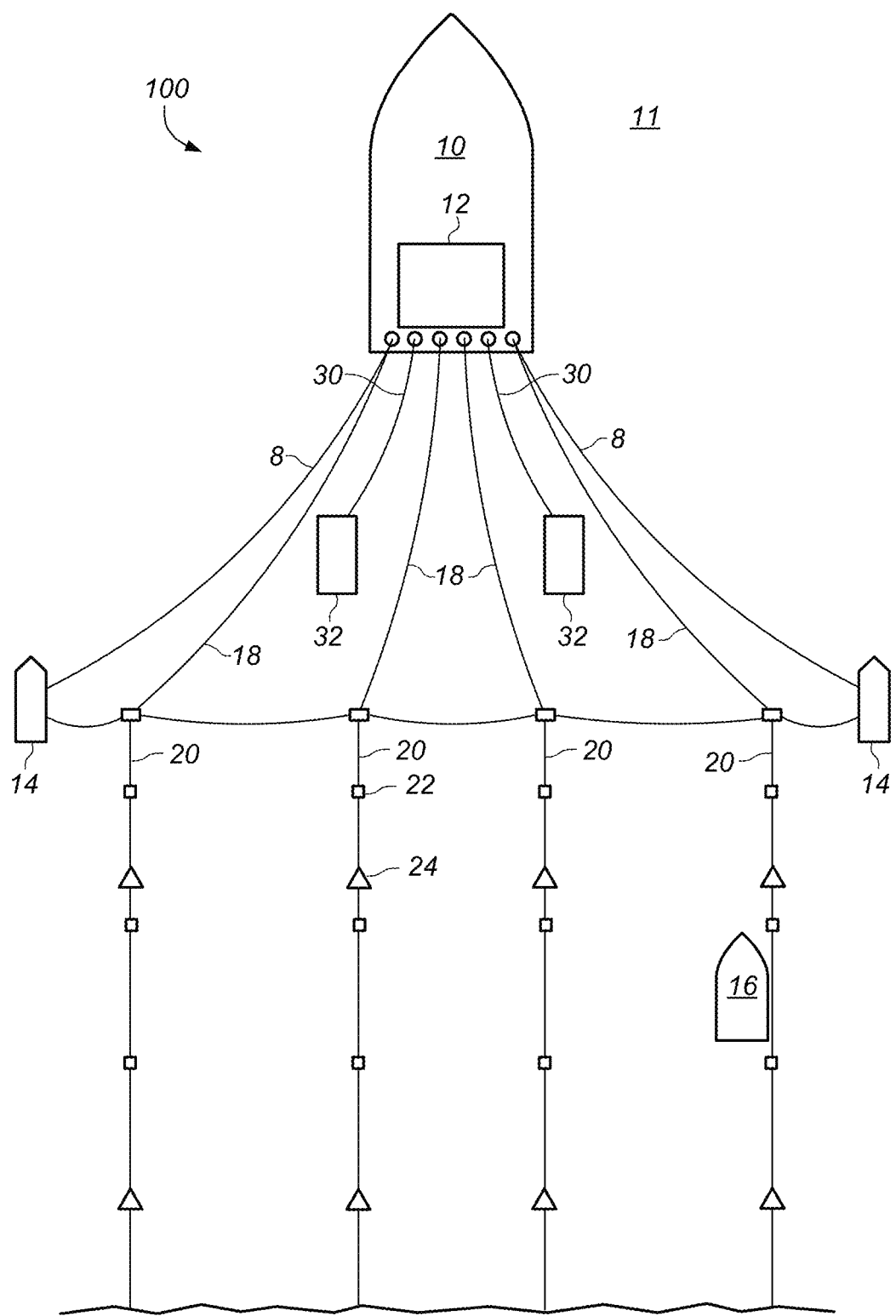
FIG. 1 shows an embodiment of a marine geophysical survey.
Figure 2A:
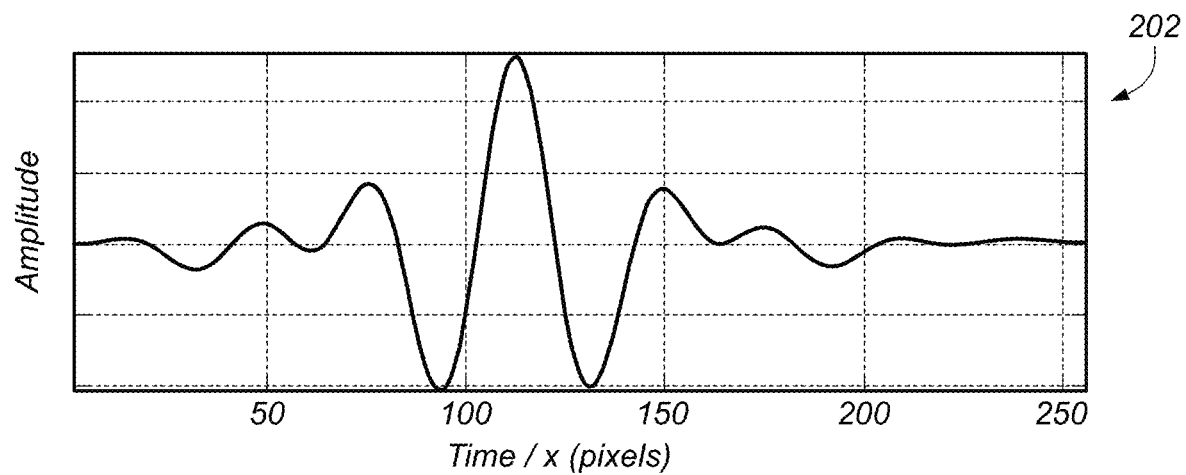
FIGS. 2A-B show embodiments of real and imaginary components of a complex curvelet basis function.
Figure 2B:
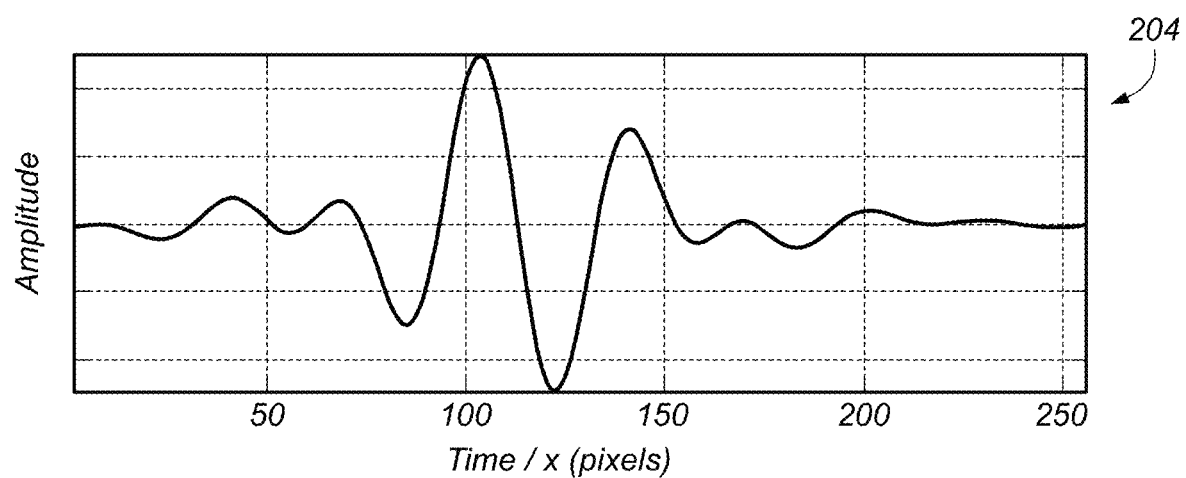

This disclosure initially describes, with reference to FIG. 1, an overview of a geophysical survey system. It then describes example transform and noise removal techniques with reference to FIGS. 2-9. Techniques for using dip maps to control adaptation of, e.g., a noise template are discussed with respect to FIGS. 10-15. Finally, an example computing system is described with reference to FIG. 16.

Survey Overview

Referring to FIG. 1, an illustration of one embodiment of a geophysical survey system 100 is shown (not necessarily to scale). System 100 includes survey vessel 10 (also referred to as a "first vessel"), signal sources 32, source cables 30, paravanes 14, and streamers 20. (Streamers 20 are shown truncated at the bottom of FIG. 1.) Survey vessel 10 may be configured to move along a surface of body of water 11 such as a lake or ocean. In the illustrated embodiment, survey vessel 10 tows streamers 20, signal sources 32, and paravanes 14, which may be used to provide a desired amount of spread among streamers 20. In other embodiments, streamers 20 may be towed by a separate vessel (not shown), rather than survey vessel 10 that tows signal sources 32.

Streamers 20 may include sensors 22 (e.g., hydrophones, geophones, electromagnetic sensors, etc.). Streamers 20 may further include streamer steering devices 24 (also referred to as "birds") which may provide selected lateral and/or vertical forces to streamers 20 as they are towed through the water, typically based on wings or hydrofoils that provide hydrodynamic lift. Streamers 20 may further include tail buoys (not shown) at their respective back ends. System 100 further includes chase vessel 16 (also referred to as a "second vessel"), which may be used to maintain (e.g., clean, service, or repair) selected elements of system 100 (e.g., streamers 20) as needed. For example, sections of a streamer 20 may be replaced, or auxiliary equipment may be replaced. For example, chase vessel 16 may include devices (discussed in more detail below) to allow streamers 20 to be lifted out of the water as desired.

Survey vessel 10 may include equipment, shown generally at 12 and for convenience collectively referred to as a "recording system." Recording system 12 may include devices such as a data recording unit (not shown separately) for making a record with respect to time of signals generated by various geophysical sensors. Recording system 12 may also include navigation equipment (not shown separately), which may be configured to control, determine, and record, at selected times, the geodetic positions of: survey vessel 10, signal sources 32, streamers 20, sensors 22, etc. As illustrated in FIG. 1, streamers 20 are coupled to survey vessel 10 via cables 18.

Collectively, the survey data that is recorded by recording system 12 may be referred to as "marine survey input data." In embodiments where the survey being performed is a seismic survey, the recorded data may be more specifically referred to as "marine survey seismic data," although the marine survey input data may encompass survey data generated by other techniques. In various embodiments, the marine survey input data may not necessarily include every observation captured by sensors 22 (e.g., the raw sensor data may be filtered before it is recorded). Also, in some embodiments, the marine survey input data may include data that is not necessarily indicative of subsurface geology, but may nevertheless be relevant to the circumstances in which the survey was conducted (e.g., environmental data such as water temperature, water current direction and/or speed, salinity, etc.).

Geodetic position (or "position") of the various elements of system 100 may be determined using various devices, including navigation equipment such as relative acoustic ranging units and/or global navigation satellite systems (e.g., a global positioning system (GPS)).

Each of signal sources 32 may include sub-arrays of multiple individual signal sources. For example, a signal source 32 may include a plurality of air guns, marine vibrators, or electromagnetic signal sources. In various embodiments, a geophysical survey system may include any appropriate number of towed signal sources 32 and streamers 20.

In some embodiments, various items of information relating to geophysical surveying (e.g., raw data collected by sensors and/or marine survey input data generally, or products derived therefrom by the use of post-collection processing such as the techniques discussed below, to the extent these differ in various embodiments), may be embodied in a "geophysical data product." A geophysical data product may comprise a computer-readable, non-transitory medium having geophysical data stored on the medium, including, e.g., raw streamer data, processed streamer data, two- or three-dimensional maps based on streamer data, or other suitable representations. Some non-limiting examples of computer-readable media may include tape reels, hard drives, CDs, DVDs, flash memory, print-outs, etc., although any tangible computer-readable medium may be employed to create the geophysical data product. In some embodiments, raw analog data from streamers may be stored in the geophysical data product. In other instances, as noted above, the data may first be digitized and/or conditioned prior to being stored in the geophysical data product. In yet other instances, the data may be fully processed into a two- or three-dimensional map of the various geophysical structures, or another suitable representation, before being stored in the geophysical data product. The geophysical data product may be manufactured during the course of a survey (e.g., by equipment on a vessel) and then, in some instances, transferred to another location for geophysical analysis, although analysis of the geophysical data product may occur contemporaneously with survey data collection. In other instances, the geophysical data product may be manufactured subsequent to survey completion, e.g., during the course of analysis of the survey.

Noise Processing in Marine Survey Data and Overview of Complex Transforms

As noted above, when collecting marine survey input data of any type, the resultant data may include not only useful information indicative of, e.g., subsurface geology, but also noise that may interfere with useful information. One approach for dealing with such noise involves application of a model or template representative of expected noise to the marine survey input data. For example, prior survey experience in a particular area may lead to an understanding of typical noise phenomena that may tend to occur in that area. These phenomena may then be modeled by a noise template that can be applied to marine survey input data to subtract the modeled noise, ideally improving the signal-to-noise ratio of the resultant data.

Regardless of how the noise template is initially generated, it may be possible to further improve its effectiveness by adapting the noise template to more accurately resemble the actual noise present in a given set of marine survey input data. For example, even if a noise phenomenon is understood and modeled in a general way, there may be numerous variations of how that phenomenon might interact with data collected in a particular survey, owing to variability in the exact geometry with which the survey is conducted (e.g., the number of sources and sensors employed, their relative orientation, the orientation of the survey system within the survey environment, etc.), variability in environmental conditions, and/or other possible factors. Specifically adapting a generalized noise template to particular marine survey input data may at least partially account for such variability, thus better fitting the noise template to the actual noise that is encountered.

One approach for adapting a noise template involves a process of least-squares filtering, in which one or more convolutional filters are designed in the time-space (t-x) domain. Such convolutional filter(s) may be employed to adapt the noise template so that the residual energy after subtracting the adapted template from the input data is minimized.

By contrast, the following discussion describes techniques in which marine survey input data as well as a noise template are transformed from the input (e.g., t-x) domain into a transform domain, where adaptation of the noise template occurs in the transform domain. Generally speaking, the process of transforming data from an input domain to a transform domain can be understood as a process of mapping or projecting the input-domain representation of the data onto a set of transform-domain basis functions to generate a set of coefficients of those basis functions that are representative of the transformed data. The sum of the basis functions weighted by their respective coefficients may constitute the transform-domain representation of the original data. In some cases, mathematical equivalence of the transform-domain representation to the original-domain representation may require an infinite number of coefficients, although for practical purposes, the number of coefficients employed may depend on the degree of precision or resolution required by a particular application.

For example, the well-known Fourier transform can be used to transform a time-domain signal into the frequency domain, where the Fourier basis functions are sine and/or cosine signals at various frequencies, and where the transform involves generating a set of Fourier coefficients respectively corresponding to the basis functions. The resulting linear sum of the Fourier basis functions weighted by the Fourier coefficients constitutes a frequency-domain representation of the original time-domain signal.

In the following discussion, the types of transforms that may be employed may generally be referred to as complex-valued, directional, multi-resolution (CDM) transforms. Like transforms generally, the transformation of input domain data to a CDM transform domain involves the generation of a set of coefficients corresponding to a set of CDM transform basis functions in order to generate a weighted sum of coefficients and basis functions. Generally speaking, a CDM transform is "complex-valued" in the sense that the CDM transform basis functions are defined in the complex number plane, and may include both real and imaginary parts. CDM transform coefficients may also be complex numbers. A CDM transform is "directional" in the sense that the properties of the CDM transform basis functions are anisotropic (i.e., directionally dependent). For example, for CDM transform basis functions defined on a 2-dimensional plane, the behavior of the basis function along one dimension may differ from the behavior of the basis function along an orthogonal dimension. (It is noted that CDM transform basis functions may be defined in 3-dimensional or higher-order spaces.) Finally, a CDM transform is "multi-resolution" in the sense that the CDM transform basis functions may occupy different frequency bands, where different frequencies are capable of representing data at different resolutions.

CDM transforms may include a variety of more specific types of transforms, including complex curvelet transforms, complex wavelet transforms, and complex contourlet transforms. Although the following discussion focuses principally on the complex curvelet transform, it is noted that the techniques described below may apply equally to complex wavelets, contourlets, or other types of CDM transforms. Moreover, while the techniques are described below principally with respect to discrete CDM transforms, they may also be applicable to continuous CDM transforms.

Generally speaking, the complex curvelet transform of data from an input domain is represented as a weighted sum of complex curvelet basis functions, where the weights (i.e., coefficients) are also complex-valued. In some implementations, the complex curvelet basis function may be represented as a combination of two real-valued curvelet basis functions, the first representing the real part of the complex basis function, and the second representing the imaginary part. The real and imaginary parts of the complex curvelet basis function may exhibit a constant phase-shift relationship. For example, in the embodiment shown in FIG. 2, real 202 and imaginary 204 parts of a cross-section of a complex curvelet basis function are shown to resemble windowed sinusoids having a 90-degree phase offset.

Figure 3:
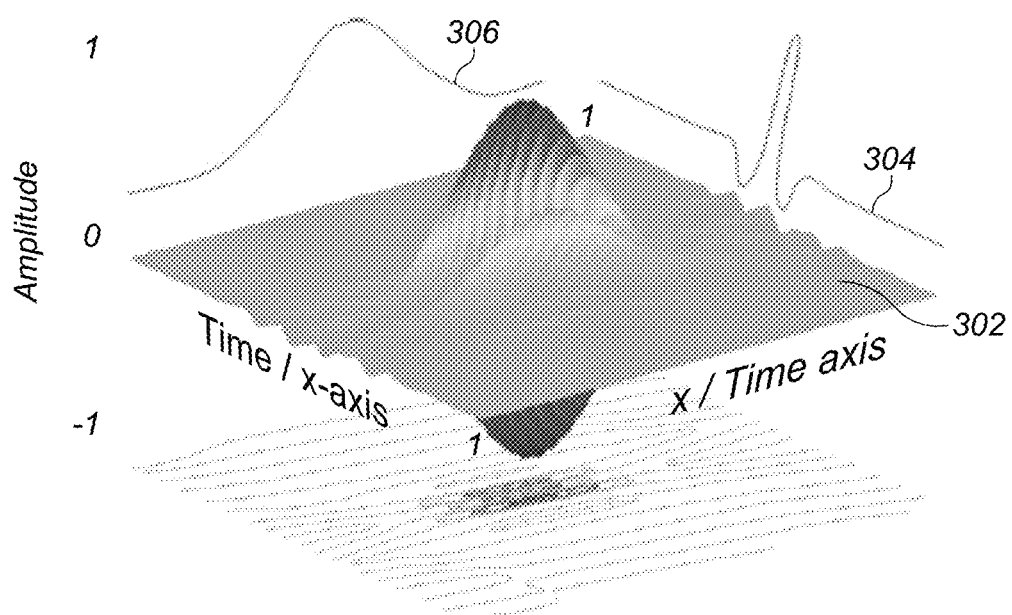
FIG. 3 illustrates anisotropy exhibited by an embodiment of a curvelet basis function.

FIG. 3 illustrates the anisotropy exhibited by one example of a curvelet basis function. In FIG. 3, a real-valued 2-dimensional curvelet basis function 302 is shown. (As noted above, a complex curvelet basis function may employ a combination of such real-valued curvelets.) When projected across one dimension, cross-section 304 of the curvelet basis function resembles a windowed sinusoid that quickly decays towards zero. When projected across the orthogonal dimension, cross-section 306 of the curvelet basis function has a Gaussian profile. When combined, these give rise to a series of undulating ridges having a pronounced orientation and approximately finite extent. (It is noted that FIG. 3 is merely one example intended to facilitate understanding, and that many variations are possible and contemplated.)

Figure 4:
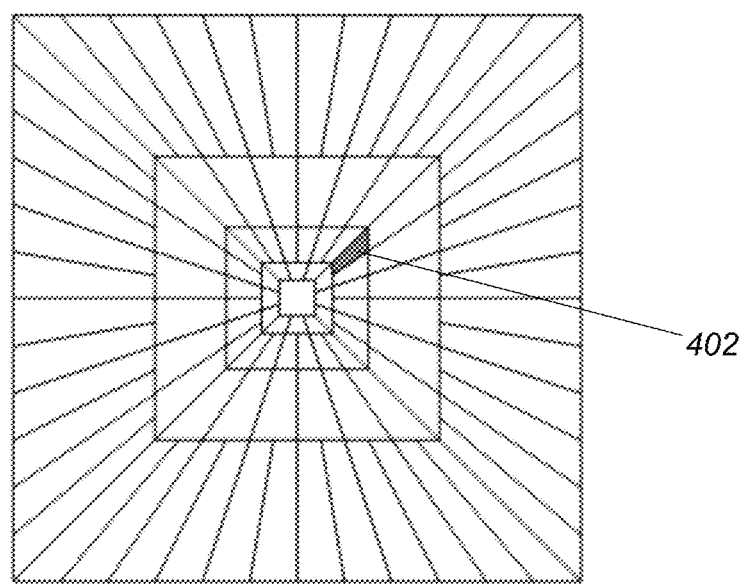
FIG. 4 illustrates an example of how a curvelet transform relates to a frequency-wavenumber (f-k) representation of data.

FIG. 4 graphically illustrates one example of how a curvelet transform relates to a frequency-wavenumber (f-k) representation of data. In the illustrated example, the curvelet transform first divides the f-k domain into a number of concentric square annuli, which may also be referred to as scales. Four annuli (not counting the centermost square around which the annuli are centered) are shown in the embodiment of FIG. 4, although any suitable number may be employed. Each annulus or scale may then be divided into a number of angled wedges, a selected one of which is shaded in FIG. 4 and denoted 402. Each wedge may have its own respective set of curvelet coefficients, and this collection of coefficients may be referred to as a "subband."

Noise Reduction with Global Adaptation

As noted above, noise reduction in marine survey input data may be improved if an existing noise template is adapted to more closely fit the marine survey input data before it is applied to that data. However, different noise phenomena may behave differently, and adaptation techniques suited to one phenomenon may be less suited to others. For example, variations or perturbations in the noise model relative to the marine survey input data may occur on a relatively small scale in space or time. Such variations may be referred to as "local variation," and in some instances, they may reflect conditions that are localized within the survey (such as, e.g., the presence of a discrepancy that affects survey observations within a certain vicinity of some point in space or time, but not observations that are more remote from that point).

Other types of variation in the noise model relative to the marine survey input data may occur on a large scale in space or time, and may be referred to as "global variation." Global variation may reflect systematic mismatches between the noise template and the marine survey input data (such as, e.g., a mismatch between the two in space or time, or another type of pervasive discrepancy that affects many or possibly all points within the survey).

Figure 5:
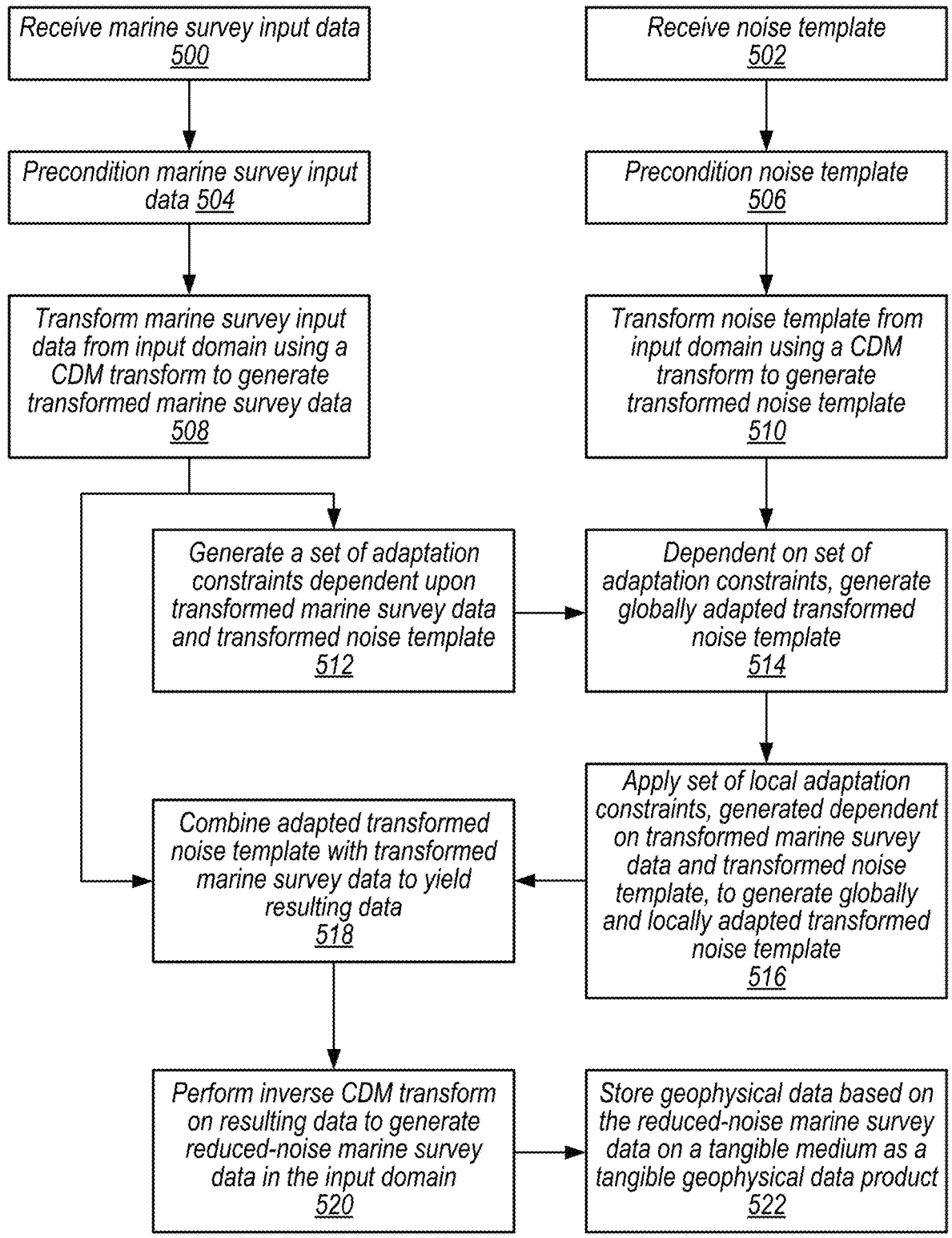
FIG. 5 shows a data flow diagram that illustrates an embodiment of a method for performing global and local adaptation on a noise template in a complex-valued, directional, multi-resolution (CDM) transform domain.

Techniques for reducing local variation in the noise template may not be as effective in reducing global variation, or vice versa. The data flow diagram of FIG. 5 illustrates an embodiment of a technique for performing global and, in some embodiments, local adaptation on a noise template in a CDM transform domain. In some circumstances, the combination of global and local adaptation may be more effective than local adaptation performed alone. In some embodiments, however, local adaptation may be omitted and only global adaptation may be performed.

Operation begins at blocks 500-502 where marine survey input data and a noise template are received. (As a preliminary matter, because the marine survey input data and noise template follow separate processing paths, FIG. 5 is primarily organized to reflect the data flow of these separate paths. However, although processing may occur in parallel to the extent data flow permits, the illustrated operations on the various paths are not necessarily performed synchronously. Moreover, in some embodiments, processing may occur sequentially rather than in parallel.) As noted above, the marine survey input data may include geophysical data indicative of geological structure, and may include noise. The noise template may be indicative of predicted noise in the marine survey input data.

Prior to further processing, either the marine survey input data, the noise template, or both may be preconditioned (block 504-506). Such preconditioning may be employed to correct for errors that can be precisely defined in the input domain (e.g., the t-x domain). For example, the marine survey input data might be misaligned with respect to the noise template in space or time by a constant amount across the entire data set; in this case, preconditioning may involve uniformly correcting for such misalignment. It is noted that the preconditioning operation may be omitted; in some embodiments, the types of errors addressed by preconditioning may be adequately processed in the global adaptation stage discussed below. In some embodiments, the preconditioning of blocks 504-506 may be omitted.

The marine survey input data may then be transformed from an input domain using a CDM transform to generate transformed marine survey data (block 508). For example, the CDM transform may include the complex curvelet transform discussed above, which may be applied to t-x domain survey data to generate curvelet domain data. However, in other embodiments, a wavelet transform, contourlet transform, or other type of CDM transform may be employed. In a similar manner, the noise template may be transformed using the CDM transform to generate a transformed noise template (block 510).

Dependent upon the transformed marine survey data and the transformed noise template, a set of adaptation constraints is generated (block 512). As discussed in greater detail below with respect to FIG. 6, in some embodiments, the adaptation constraints may be generated by performing statistical parameter estimation with respect to the transformed marine survey data and the transformed noise template. Moreover, in some embodiments, the adaptation constraints may include global adaptation constraints and local adaptation constraints, although in other embodiments in which local adaptation is omitted, only global adaptation constraints may be generated.

Dependent on the set of adaptation constraints, a globally adapted transformed noise template is generated (block 514). Generation of the adapted transformed noise template at this stage may reduce one or more instances of global variation in the transformed noise template. As discussed in greater detail below with respect to FIG. 7, in some embodiments, generation of the globally adapted transformed noise template (which may also be referred to as "global adaptation") may be performed by applying a set of complex unary filters, resulting from generation of the global adaptation constraints, to the transformed noise template. As described below, the set of complex unary filters may include a member for each subband of the transformed noise template, and the member may be generated dependent upon first order statistics (e.g., a mean amplitude ratio and a mean phase difference) for the corresponding subband based on the statistical parameter estimation process described with respect to FIG. 6.

A set of local adaptation constraints, generated dependent upon the transformed marine survey data and the transformed noise template, may be applied to the globally adapted transformed noise template to generate a globally and locally adapted transformed noise template (block 516). Generation of the globally and locally adapted transformed noise template at this stage may reduce one or more instances of local variation in the transformed noise template. As discussed in greater detail below with respect to FIG. 8, generation of the globally and locally adapted noise template (which may also be referred to as "local adaptation") may be performed by further modifying curvelet coefficients of the noise template using the results of the statistical parameter estimation mentioned above. As noted previously, in some embodiments, the local adaptation step may be omitted.

The adapted transformed noise template (i.e., either globally and locally adapted, or only globally adapted) is then combined with the transformed marine survey data to yield resulting data (block 518). The process of combining the adapted transformed noise template with the transformed marine survey data may operate to remove noise from the transformed marine survey data. In some embodiments, the combining process may be referred to as subtraction, and in fact some implementations may implement the combining process as simple pointwise subtraction. However, the combining process may also be considerably more sophisticated than simple pointwise subtraction, because even following the adaptation process, some mismatches (e.g., in amplitude, phase, or other factors) may remain between the data and the adapted noise template. Accordingly, in some embodiments, "subtraction" may refer to a process of adaptive subtraction, in which an attempt is made to minimize an energy difference (e.g., in a least-squares sense, or according to another suitable criterion) between the transform-domain representation of the marine survey data and the adapted noise template.

An inverse CDM transform is then performed on the resulting data to generate reduced-noise marine survey data in the input domain (block 520). For example, in embodiments where the CDM transform is a complex curvelet transform, an inverse curvelet transform may be applied to yield reduced-noise or "de-noised" marine survey data in the original input domain (e.g., the t-x domain). (The term "de-noised" does not necessarily mean that all noise has been removed, but rather that at least some noise has been reduced.) Geophysical data based on the reduced-noise marine survey data may be stored on a tangible medium to complete the manufacture of a tangible geophysical data product of the type described above (block 522). For example, a geophysical data product storing reduced noise marine survey data or other data derived from the reduced noise marine survey data may be generated in one location (e.g., on an offshore vessel) and later transported to another location (e.g., an onshore data analysis center) for further operations (e.g., further geophysical analysis to ascertain the presence of hydrocarbons). In some embodiments, the manufacture of the geophysical data product may be omitted.

Figure 6:
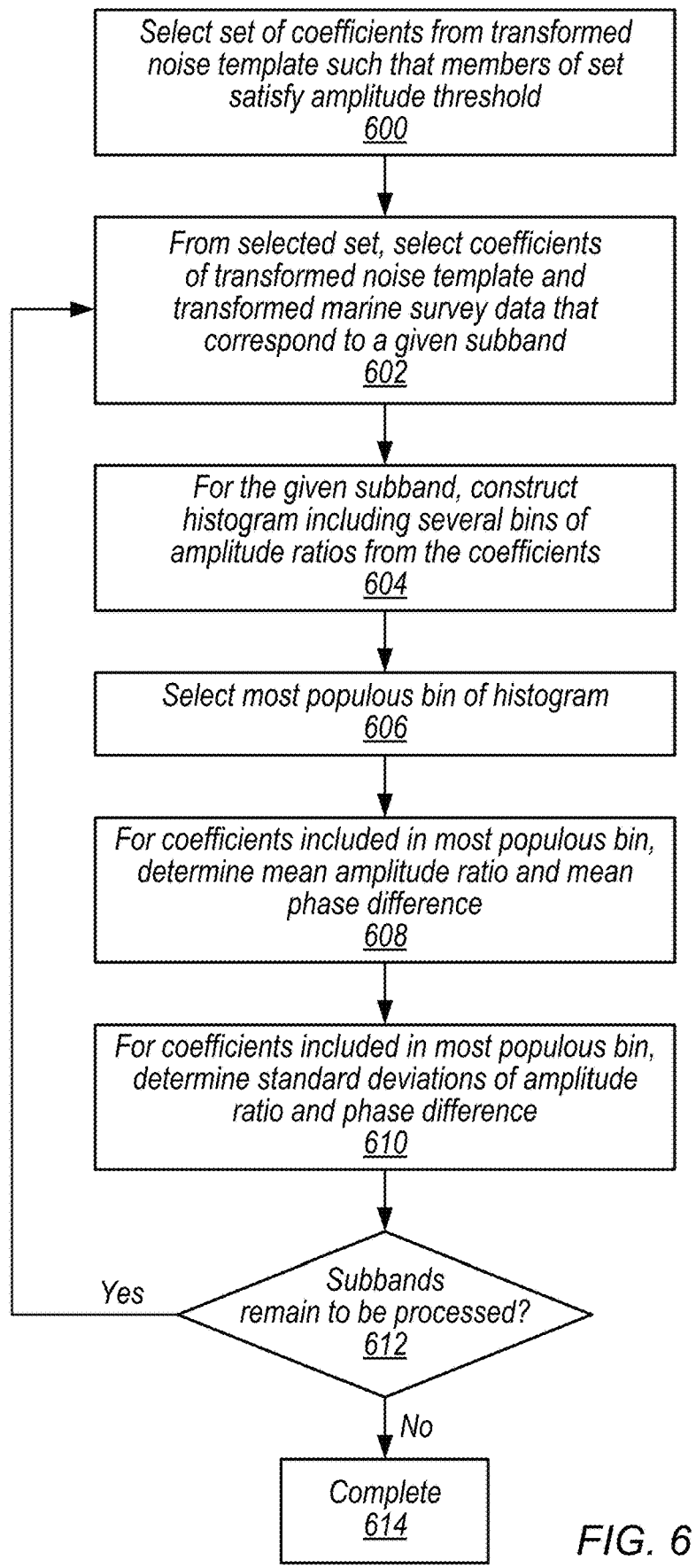
FIG. 6 shows a flow diagram that illustrates an embodiment of a method of statistical parameter estimation that may be used to generate a set of adaptation constraints for noise template adaptation.

The flow chart of FIG. 6 illustrates an embodiment of a method of statistical parameter estimation that may be employed to generate the set of adaptation constraints described above with respect to block 512 of FIG. 5. Specifically, in the illustrated embodiment, generating the set of adaptation constraints (including the global adaptation constraints and, if implemented, the local adaptation constraints mentioned above) includes performing statistical parameter estimation with respect to at least one subband of the transformed marine survey data and at least one subband of the transformed noise template.

Preliminarily, as discussed below, the illustrated technique operates on curvelet coefficients of the transformed noise template on a subband-by-subband basis. As noted with respect to FIG. 4, a subband of curvelet-domain data corresponds to a particular segment or wedge of one of the illustrated concentric square annuli. Generally speaking, the number of subbands employed for a given curvelet transform may vary depending on the particular implementation of the transform and/or on the characteristics of the data to be transformed. Increasing the number of subbands may provide greater resolution, which may improve processing of data whose frequencies occupy a broad spectrum. However, increasing the number of subbands may also present a tradeoff in the resolution in the f-k transform domain relative to the t-x input domain; as the number of subbands increases, the f-k support of each curvelet basis function may reduce, yielding finer resolution, but may correspondingly spread out in the t-x domain, yielding coarser resolution. Secondarily, increasing the number of subbands may increase the computational workload required to apply the transform, representing a possible tradeoff in resolution versus speed.

In FIG. 6, processing begins at block 600 where a set of coefficients is selected from the transformed noise template such that members of the set each satisfy an amplitude threshold. Those coefficients in the transformed marine survey data that correspond to the coefficients selected from the transformed noise template may also be retained. For example, there may be a one-to-one correspondence between curvelet coefficients in the transformed noise template and curvelet coefficients in the transformed marine survey data.

In some embodiments, the amplitude threshold may be a user-configurable parameter. For example, the amplitude threshold may be expressed as a percentile, such that only those curvelet coefficients of the noise template at or above the xth percentile would be selected. The choice of the percentile threshold x may be made by the user dependent upon an assessment of the noise template being employed with respect to the particular set of marine survey input data being processed. For example, if it is expected that the noise template will predict noise in the survey data relatively poorly, the amplitude threshold may be chosen to be higher, to bias the selection of coefficients in the noise template towards those having higher amplitudes. On the other hand, if the noise template is expected to predict noise relatively well, the amplitude threshold may be chosen to be lower, and the resultant selection of coefficients will be more inclusive.

Next, the statistical parameter estimation process selects from the output of block 600 the coefficients of the transformed noise template and the transformed marine survey data that correspond to a given subband (block 602). For the given subband of the transformed marine survey data and the corresponding subband of the transformed noise template, a histogram including several bins of amplitude ratios is constructed from the coefficients (block 604). In the illustrated embodiment, each amplitude ratio in the histogram indicates a ratio of a member $c_m$ of the set of coefficients selected from the transformed noise template according to the amplitude threshold in block 602 and a corresponding coefficient $c_d$ of the transformed marine survey data. Because the coefficients in a complex curvelet transform may themselves be complex-valued, the magnitude of the coefficient may be taken before the ratio is determined: $|c_d|/|c_m|$.

Construction of the histogram may be performed manually by the user or automatically. In particular, in various embodiments the bin size may be defined according to either an absolute scale or a logarithmic scale. In some embodiments, the bin size may be determined dependent upon whether a most populous bin of the histogram satisfies a population threshold. For example, the threshold requirement may be that the most populous bin should contain no more than a specified fraction (e.g., half, though any suitable parameter may be chosen) of the total number of points in the histogram. If the threshold requirement is not met with an initial bin size because the most populous bin contains too many points, the bin size may be reduced and the histogram regenerated. This process may occur iteratively until the threshold requirement is satisfied. (It is also possible to proceed in the opposite direction, starting with an arbitrarily small bin size and iteratively increasing it until the threshold requirement is satisfied.)

Following generation of the histogram, the most populous bin of the histogram is selected (block 606). For the coefficients included in the most populous bin, a mean amplitude ratio and a mean phase difference are determined (block 608). Generation of the mean amplitude ratio and phase difference may also be referred to as generation of first order statistics. The mean amplitude ratio and the mean phase difference may be denoted as $\Gamma_i$ and $\Phi_i$ respectively, where i denotes the particular subband to which these statistics correspond. Collectively, the first order statistics that are determined across the set of subbands may correspond to the set of global adaptation constraints discussed above with respect to FIG. 5. It is noted that any suitable numerical or other techniques for determining the most populous bin of the histogram and for generating the first order statistics may be employed.

In embodiments where local adaptation is employed, a standard deviation of amplitude ratio and a standard deviation of phase difference are determined (block 610). Generation of these standard deviations may also be referred to as generation of second order statistics. The standard deviation of amplitude ratio and the standard deviation of phase difference may be denoted as $\gamma_i$ and $\varphi_i$ respectively, where i again denotes the particular subband to which these statistics correspond. Collectively, the second order statistics that are determined across the set of subbands may correspond to the set of local adaptation constraints discussed above with respect to FIG. 5.

If any subbands remain to be processed (block 612), operation proceeds again from block 602 where a different subband and its coefficients are selected for statistical parameter estimation processing. Otherwise, statistical parameter estimation is complete (block 614). It is noted that although FIG. 6 has been described as iterating over subbands to facilitate explanation, the operations of FIG. 6 may proceed with respect to multiple subbands concurrently.

It is noted that in some circumstances, the coefficients of the subbands may be too sparse to permit construction of a useful histogram. Accordingly, in some embodiments, subbands may be grouped together into subsets before the statistical parameter estimation process occurs. For example, such grouping may be performed adaptively depending on the results of initially attempting to perform statistical parameter estimation on individual subbands. In embodiments where subbands are grouped into subsets, the subsequent statistical parameter estimation, global adaptation, and local adaptation processes would take place with respect to subsets rather than subbands. That is, the term "subset" may be appropriately substituted for "subband" in the discussions of FIGS. 6-8 without loss of generality.

Moreover, although the above discussion centers on generation of a histogram as a manner of performing statistical parameter estimation, a histogram represents merely one possible approach. Other techniques for statistically sampling or analyzing the coefficients may be employed without necessarily involving the use of a histogram.

Figure 7:
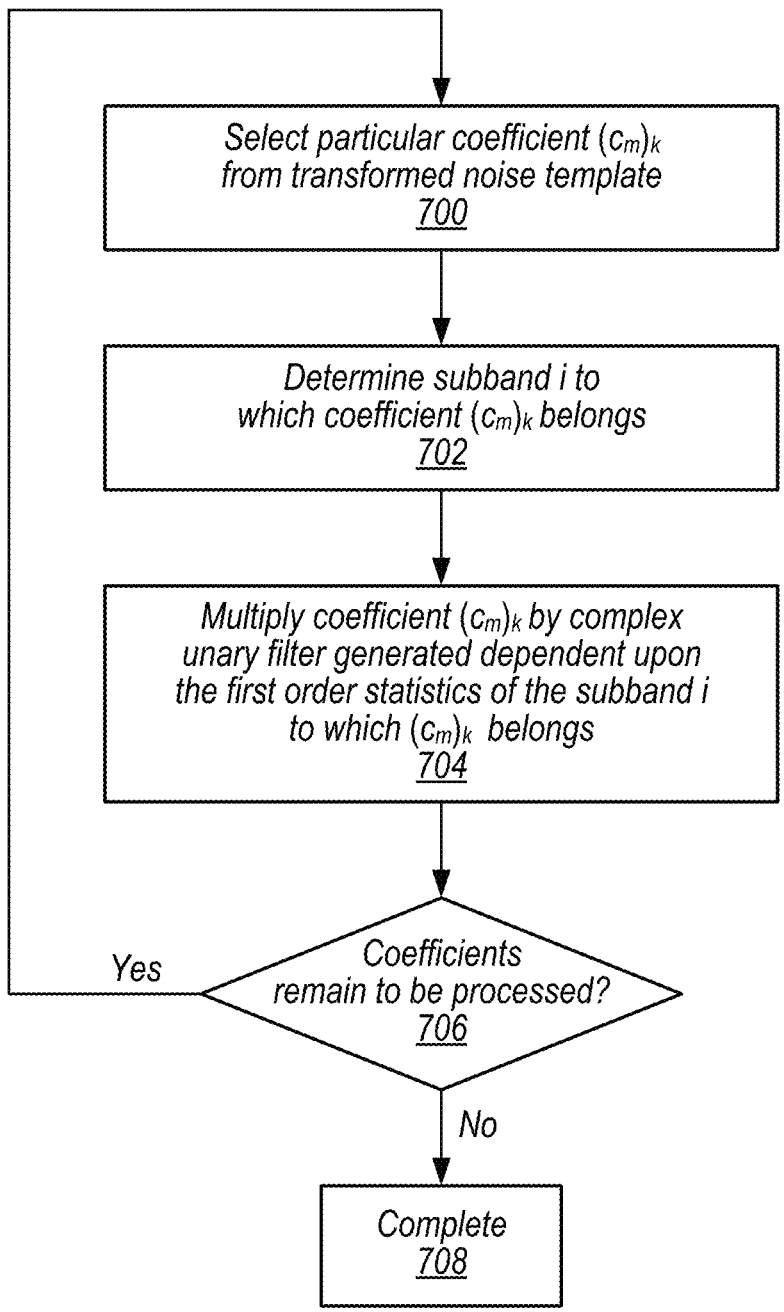
FIG. 7 shows a flow diagram that illustrates an embodiment of a method of global adaptation of a noise template.

The flow chart of FIG. 7 illustrates an embodiment of a process of global adaptation of a noise template, representing an example of a process that may be implemented by block 514 of FIG. 5 to generate the globally adapted transformed noise template discussed above.

The processing of FIG. 7 begins at block 700 where a particular coefficient of the transformed noise template, denoted $(c_m)_k$ is selected. At block 702, the subband i to which selected coefficient $(c_m)_k$ belongs is determined. (In some implementations, the curvelet transform may output coefficients grouped by subband, so determining the subband for a particular coefficient may be computationally trivial.)

Selected coefficient $(c_m)_k$ is then multiplied by a complex unary filter generated dependent upon the first order statistics of the subband to which selected coefficient $(c_m)_k$ belongs (block 704). The complex unary filter may have the form $f_i=\Gamma_i e^{j\Phi_i}$, where $\Gamma_i$ and $\Phi_i$ respectively denote the mean amplitude ratio and the mean phase difference for subband i as discussed above. The complex unary filter $f_i$ may be constructed as part of the statistical parameter estimation process of FIG. 6, or may instead be generated at the time global adaptation is performed from the first order statistics output from the statistical parameter estimation process. It is noted that in some embodiments, some or all of the first-order statistics may be selectively overridden by one or more constant user-defined values. That is, in some cases, the first-order statistics may be partially or entirely ignored after being generated (e.g., if deemed to be aberrant or unreliable), or generation of the first-order statistics may be selectively suppressed in whole or part, at the user's option.

If any remaining coefficients of the transformed noise template remain to be processed (block 706), operation proceeds from block 700 where another coefficient is selected. Otherwise, global adaptation of the transformed noise template is complete (block 708). It is noted that although the global adaptation process is shown as an iterative process to facilitate explanation, it may be implemented with any suitable degree of concurrency.

Figure 8:
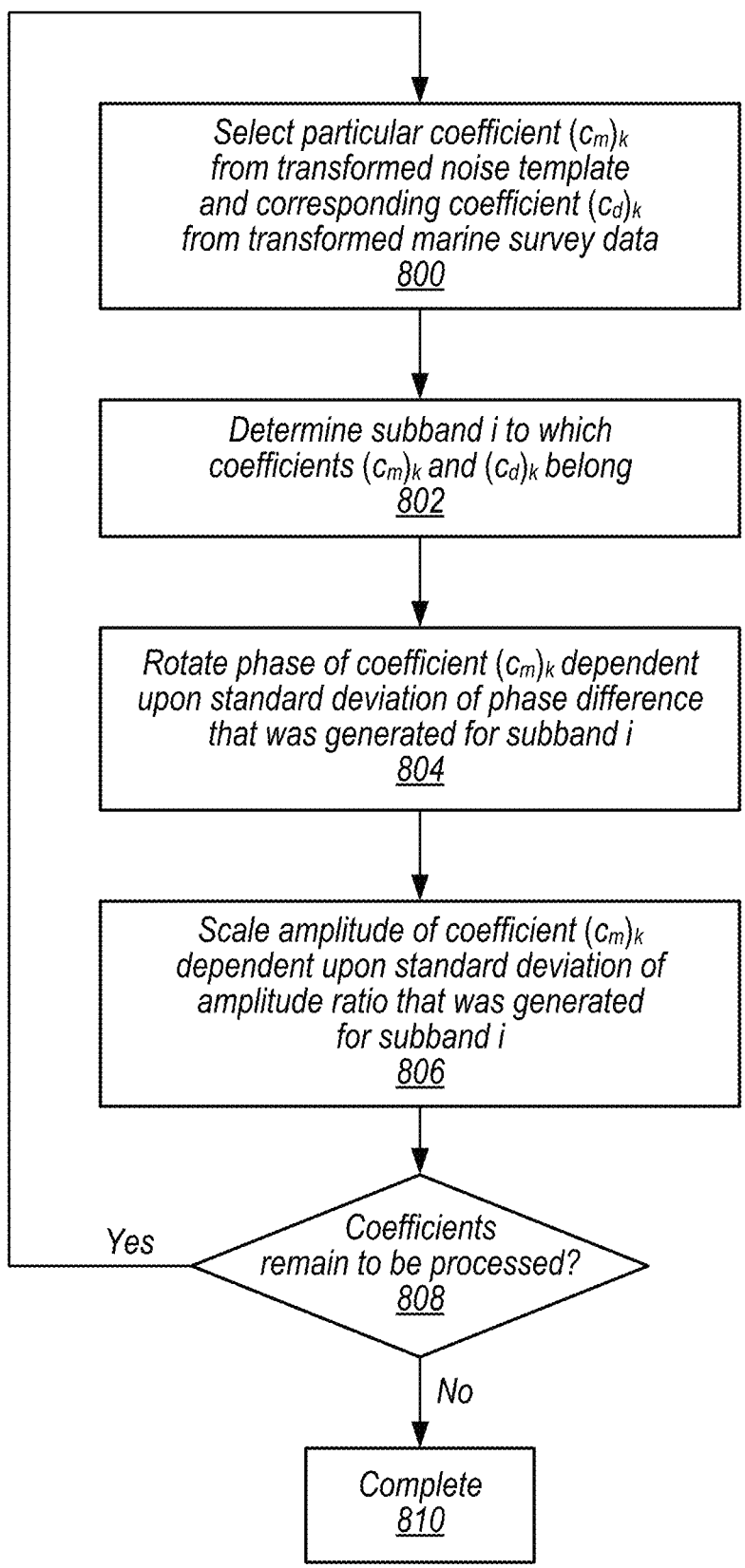
FIG. 8 shows a flow diagram that illustrates an embodiment of a method of local adaptation of a noise template.

The flow chart of FIG. 8 illustrates an embodiment of a process of local adaptation of a noise template, representing an example of a process that may be implemented by block 516 of FIG. 5 to generate the globally and locally adapted transformed noise template discussed above.

The processing of FIG. 8 begins at block 800 where a particular coefficient of the transformed noise template, denoted $(c_m)_k$ is selected, along with its corresponding coefficient in the transformed marine survey data, denoted $(c_d)_k$. At block 802, the subband i to which the selected coefficients belong is determined. (As noted above with respect to FIG. 7, determining the subband for a particular coefficient may be computationally trivial for some implementations of the curvelet transform.)

The phase of selected coefficient $(c_m)_k$ is then rotated dependent upon the standard deviation of phase difference $\varphi_i$ that was generated for subband i as part of the statistical parameter estimation process (block 804). In some embodiments, the phase of selected coefficient $(c_m)_k$ is rotated to become as close as possible to the phase of corresponding coefficient $(c_d)_k$, subject to a bound proportional to $\varphi_i$ (i.e., subject to rotating the phase by no more than $\lambda\varphi_i$ radians, where $\lambda$ may correspond to a user-defined scalar parameter that may have a default value, such as 1). In some implementations, this may be analytically computed simply by taking the phase difference between the two coefficients and then restricting the difference by $\varphi_i$ to yield the amount by which the phase of selected coefficient $(c_m)_k$ should be adjusted.

The amplitude of selected coefficient $(c_m)_k$ is then scaled dependent upon the standard deviation of amplitude ratio $\gamma_i$ that was generated for subband i as part of the statistical parameter estimation process (block 806). In some embodiments, this may be implemented by applying a scalar value s in the range $0 \leq s \leq \gamma_i$ so as to minimize $|(c_d)_k - s^*(c_m)_k|$. In some implementations, s can be analytically computed as $$s = \frac{|(c_d)_k|}{|(c_m)_k|} * \cos(\arg((c_d)_k) - \arg((c_m)_k))$$

and then restricting s to the range defined by $\gamma_i$. In some embodiments, as with the bound on the phase adjustment described in the previous paragraph, the bound on amplitude scaling may be proportional to $\gamma_i$ rather than exactly $\gamma_i$ (e.g., the bound may be of the form $\delta\gamma_i$ where $\delta$ is also a user-defined scalar parameter that may have a default value, such as 1).

If any remaining coefficients of the transformed noise template remain to be processed (block 808), operation proceeds from block 800 where another coefficient is selected. Otherwise, local adaptation of the transformed noise template is complete (block 810). As noted with respect to FIG. 7, the adaptation process of FIG. 8 need not be strictly iterative, but rather may be applied with any suitable degree of concurrency. Moreover, as noted above with respect to FIG. 7, in some embodiments, some or all of the second-order statistics may be selectively overridden by a constant user-defined value. That is, in some cases, the second-order statistics may be partially or entirely ignored after being generated (e.g., if deemed to be aberrant or unreliable), or generation of the second-order statistics may be selectively suppressed in whole or part, at the user's option.

Figure 9:
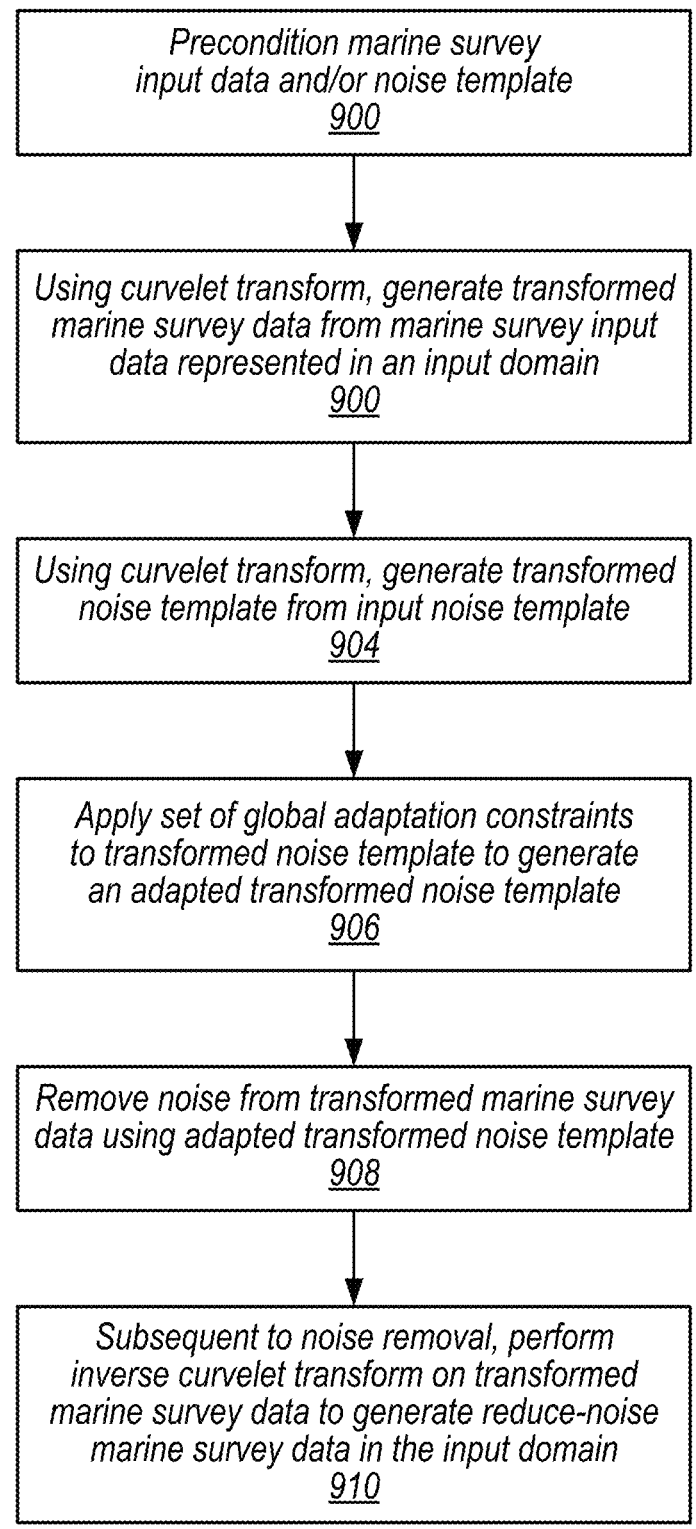
FIG. 9 shows a flow diagram that illustrates a variation of the noise removal process of FIG. 5.

FIG. 9 is an operational flow diagram that illustrates a variation of the noise removal process illustrated in FIG. 5 and is organized primarily in terms of operations rather than data flow. Operation begins in block 900 where, in a preconditioning operation, either the marine survey input data or the noise template, or both, are preconditioned prior to further processing. As discussed above, preconditioning may be employed to remove certain types of errors prior to transform-domain processing, although in some embodiments preconditioning may be omitted.

Using a curvelet transform, transformed marine survey data is generated from marine survey input data represented in an input domain (block 902). As noted previously, the marine survey input data may include geophysical data indicative of geological structure, and may contain noise.

Using the curvelet transform, a transformed noise template is generated from an input noise template (block 904). As noted previously, the input noise template may be indicative of predicted noise in the marine survey input data.

A set of global adaptation constraints is then applied to the transformed noise template to generate an adapted transformed noise template (block 906). As noted above, the set of global adaptation constraints may be generated by performing statistical parameter estimation on the transformed marine survey data and the transformed noise template. In some embodiments, as noted above, performing statistical parameter estimation may include generating a mean amplitude ratio and mean phase difference for each of a number of subbands of the curvelet transform. For example, a subset of coefficients of the transformed noise template may be selected dependent upon an amplitude criterion. A respective histogram may be generated for each subband, where the histogram reflects amplitude ratios of members of the subset of coefficients of the transformed noise template and corresponding coefficients of the transformed survey data, where the mean amplitude ratio and mean phase difference statistics for a subband are generated dependent upon a most populous bin of the respective histogram for that subband.

Noise is removed from the transformed marine survey data using the adapted transformed noise template (block 908). For example, as discussed above, a process of adaptive subtraction may be used to combine the adapted transformed noise template and the transformed marine survey data.

Subsequent to noise removal, an inverse curvelet transform is performed on the transformed marine survey data to generate reduced-noise marine survey data in the input domain (block 910). For example, the inverse curvelet transform may transform de-noised marine survey data back to the original t-x domain.

In some embodiments, as described above, the statistical parameter estimation may also include generating a set of local adaptation constraints that, for each subband, include a standard deviation of amplitude ratio and a standard deviation of phase difference. Prior to removing noise from the transformed marine survey data, the local adaptation constraints may be applied to the adapted transformed noise template. For example, for a given subband of the adapted transformed noise template, a phase of a coefficient may be rotated dependent upon the standard deviation of phase difference generated for the given subband, and an amplitude of the coefficient may be scaled dependent upon the standard deviation of amplitude ratio generated for the given subband.

Controlling Adaptation with Dip Map Data Structures

The nature of directional transforms—including, but not limited to curvelets—may present further opportunities for improving the process of denoising seismic data. Generally speaking, a directional transform encompasses a set of basis functions having different directional properties. For example, each of the wedges in the various scales of the f-k representation of the curvelet transform shown in FIG. 4 may correspond to a distinct set of curvelet coefficients that define the direction of the curvelet basis function at that location.

It is observed that the various coefficients of a directional transform are not independent and unrelated, but instead bear relationships to one another. For example, in the case of a curvelet transform, the set of curvelet coefficients that define that transform may be expressed in the form $C(i, j, t, x)$, where i denotes the scale index (i.e., identifying which of the concentric scales the coefficient corresponds to), j denotes the direction index, and t and x denote time-space indices. For this set of coefficients, coefficients having the same values of $(j, t, x)$ will describe the same data event (e.g., a seismic primary or multiple event), but at different frequencies or scale, as determined by i. Coefficients having the same curvelet subband (i, describe linear events, and coefficients having the same $(i, t, x)$ describe events having directions that fall between multiple curvelet bands. In general, different coefficients having close values for their scale, direction, and location indices $(i, j, x)$ will tend to be strongly correlated, because they describe approximately the same events. Developing a technique for representing these relationships can facilitate the denoising process, as will be described in greater detail below.

One such technique involves the generation and use of a "dip map." As used herein, a dip map refers to a data structure that represents relationships between events (e.g., seismic events) in the t-x domain to coefficients of a directional transform in the transform domain. In an embodiment, a dip map corresponding to a two-dimensional t-x domain section of data is a three-dimensional data structure (e.g., a cube) denoted $D(t, x, d)$ having time, space, and dip dimensions. For a given location of the dip map defined by a particular set of $(t, x, d)$ values, the dip map stores a dip spectrum vector that corresponds to the events having that set of index values. In some embodiments, dip may be indicative of or analogous to a gradient or rate of change of a data section at a given point in the t-x domain. In particular, for a given point in the t-x domain, the dip map (which may also be referred to as dip spectrum) may indicate how many events pass through the given point and their direction or angle. In some embodiments, dip map values may be represented using only positive values, e.g., through the application of an absolute value filter as discussed in greater detail below. Other embodiments may differ, however.

Figure 10A:
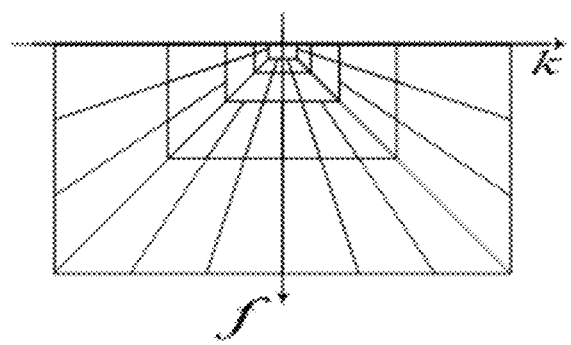
FIGS. 10A-B illustrate an example of a set of directional filters that may be used to generate a dip map, along with a portion of a curvelet transform shown in the f-k domain.
Figure 10B:
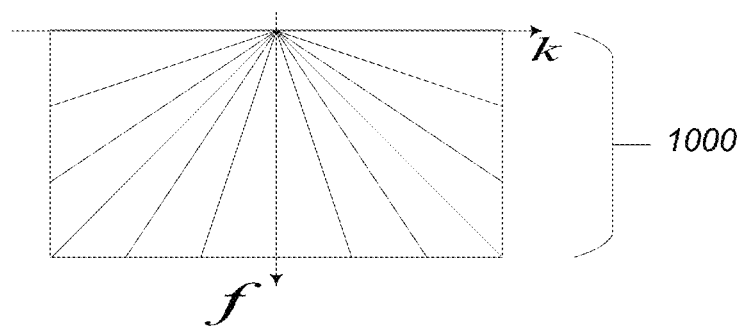
Figure 11A:
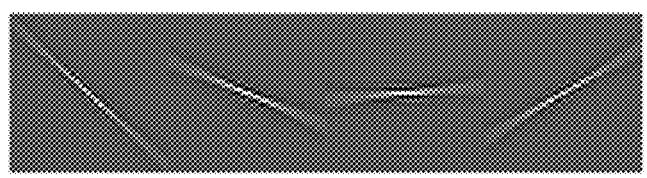
FIGS. 11A-B illustrate example representations, in the t-x and f-k domains, of selected directional filters that may be employed in dip map generation.
Figure 11B:
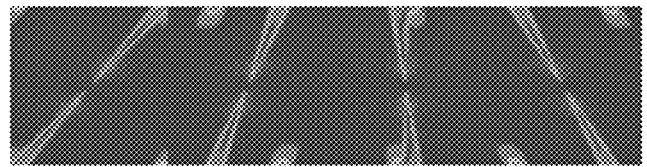

The directional filters used to generate the dip map may be related to, though not necessarily identical to, the directional filters that are otherwise used for transform-domain event denoising. For example, FIG. 10A illustrates the lower half-plane of a curvelet transform in the f-k domain. As shown, the curvelet transform includes multiple levels of scale that, in conjunction with the multiple directions, define a number of subbands having corresponding coefficients $C(i, j, t, x)$ as discussed above. In an embodiment, the set of directional filters that are used to generate the dip map is generated dependent upon the frequency supports of the curvelet transform at the highest level of scale of the curvelet transform. More particularly, the number of distinct dips d of the dip map may be determined from the number of curvelet directions at the highest scale. An example of this is illustrated in FIG. 10B, which shows a set of directional filters 1000 that are generated dependent upon the curvelet transform illustrated in FIG. 10A. In this example, twelve distinct filters are shown, corresponding to the twelve subbands at the highest scale of the curvelet transform. Unlike those wedge-shaped subbands, however, the filters 1000 have a triangular arrangement in the f-k domain that extends down to the zero frequency of that domain. FIGS. 11A-B illustrate example representations of selected ones of filters 1000: FIG. 11A illustrates the appearance of the filters in the t-x domain, and FIG. 11B illustrates the same set of filters represented in the f-k domain.

It is noted that the dip map may effectively relate different coefficients in several ways. For example, as is evident from FIG. 10B, the same dip map values may be used for all scales (i.e., the dip map is not dependent upon scale, unlike the curvelet transform itself). Therefore, curvelet coefficients across different scales may be interrelated via the dip map. Application of the dip map may have a smoothing effect that interrelates neighboring curvelets (e.g., adjacent curvelets at a given level of scale). Additionally, by considering the relative amplitude of the dip across all directions, interscale relationships of curvelet coefficients may be accounted for.

Figure 12:
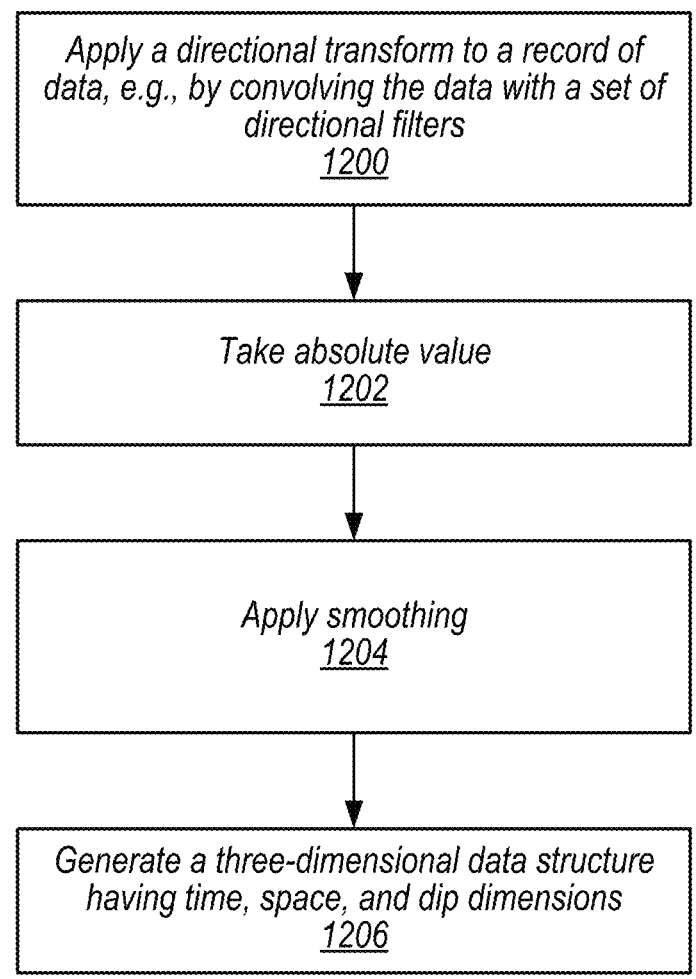
FIG. 12 shows a flow diagram that illustrates an embodiment of a method of generating a dip map data structure.

FIG. 12 illustrates an embodiment of a method of generating a dip map data structure. In the illustrated embodiment, operation begins in block 1200 by applying a directional transform to a record of data, e.g., by convolving the data with a set of directional filters. (It is noted that as used herein, a "record" of data refers to a representation of data that is stored or otherwise embodied in a physical medium. Physical media may include, by way of non-limiting example, persistent storage devices such as magnetic, optical, or nonvolatile media, various types of computer system memory, and other types of non-transitory computer-readable media as discussed below.) In some embodiments, the data may be seismic data represented in the t-x domain, and the directional filters may be generated dependent upon frequency supports of a curvelet transform at the highest level of scale, as described above with respect to FIG. 10B. It is noted that directional transforms other than curvelet transforms may be employed in some embodiments.

In block 1202, the absolute value of the result of the convolution is taken, and in block 1204, a smoothing function is applied. Generally speaking, a smoothing function operates to reduce discontinuities or sharp transitions in data, for example via a windowed process of averaging adjacent data points. Examples of smoothing functions include Gaussian or Hanning smoothing windows, as well as anisotropic (e.g., 3-D directional) smoothing windows in which the directions of the anisotropic windows are aligned with the subbands. It is noted, however, that any suitable smoothing technique may be employed. Finally, in block 1206, a three-dimensional data structure having time, space, and dip dimensions is generated.

It is noted that in various embodiments, block 1200 alone, in combination with the other operations of FIG. 12, or in combination with operations different from those illustrated in FIG. 12 correspond to various means for generating a dip map (which may include generating a multiple dip map from an adapted model of multiple noise, as described in greater detail below with respect to FIG. 15). While one such means includes application of a complex curvelet transform, equivalent means include other directional transforms.

Figure 13:
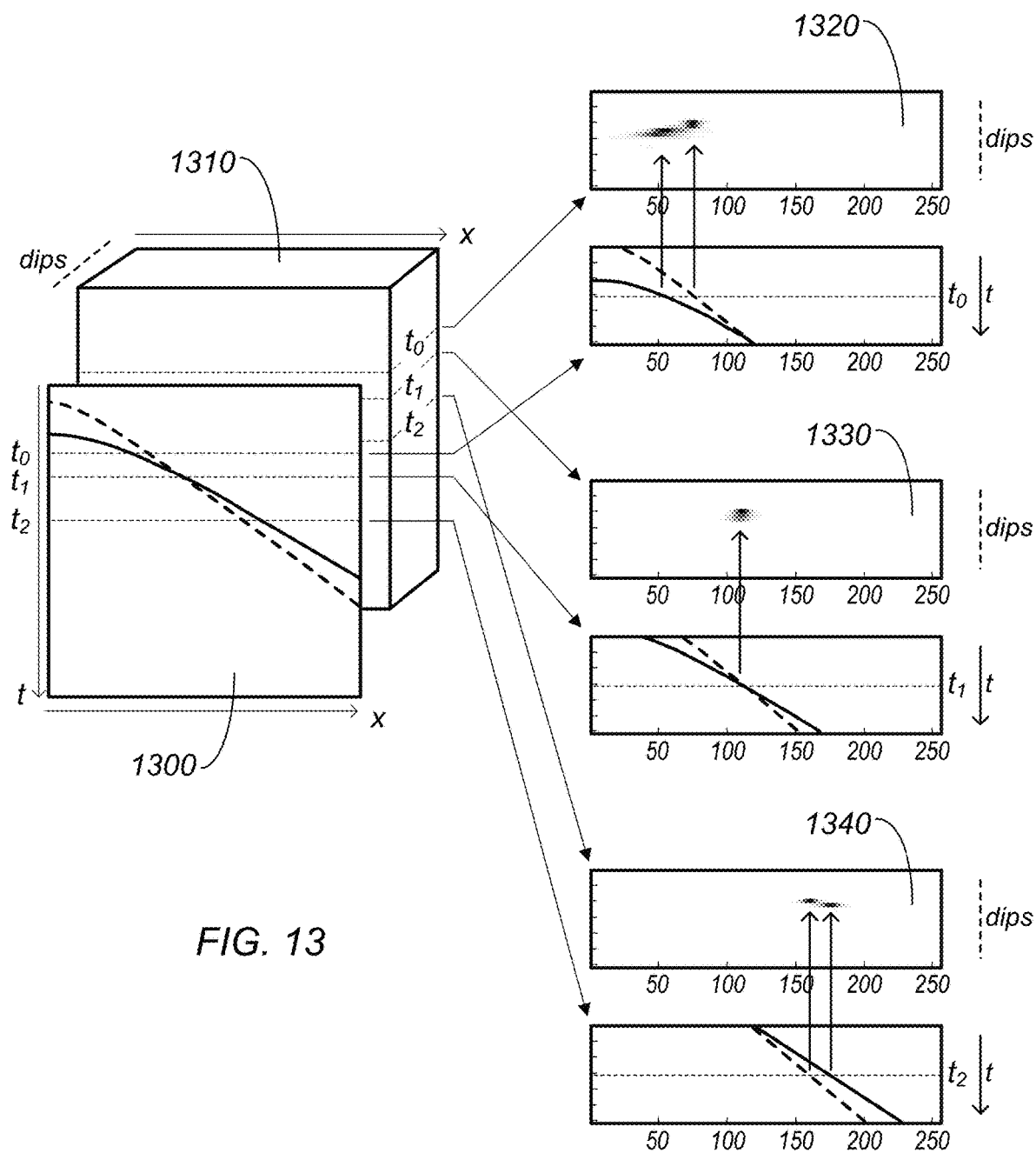
FIG. 13 illustrates an example of relationships between events in the t-x domain and a corresponding dip map.

FIG. 13 illustrates an example of the relationships between events in the t-x domain and a corresponding dip map, as simulated using synthetic input data. FIG. 13 shows a two-dimensional section 1300 of data, with the t-axis being vertical and the x-axis being horizontal. Section 1300 illustrates two distinct events, depicted by the solid and dashed lines. (Section 1300 may include an arbitrary number of events, but for simplicity, only two are shown.) For example, in a seismic survey context, the solid line may depict a primary event (e.g., a signal) and the dashed line may depict a multiple event (e.g., noise resulting from multiple reflections between a seismic source and receiver). It is noted, however, that the techniques discussed herein are not limited to seismic applications, and within seismic analysis, are not limited to noise arising from multiples. Rather, these techniques may find applicability to reduction of different types of noise in a variety of imaging contexts.

Dip map 1310 is shown in FIG. 13 as a three-dimensional data structure having a t-axis, an x-axis, and a dip axis. (Although depicted as a cube, the data structure may be arranged in any suitable fashion, e.g., within a memory or storage medium such as those discussed below.) Dip map 1310 may be generated, for example, using the method illustrated in FIG. 12, or another suitable method.

The right side of FIG. 13 illustrates the relationship between section 1300 and dip map 1310 at three distinct points in time, denoted $t_0$, $t_1$, and $t_2$. Cross-sections 1320-1340 respectively represent the two-dimensional sections of dip map 1310 that are defined at each of $t_0$, $t_1$, and $t_2$, and are juxtaposed with section 1300 such that their x-axes are aligned in the same direction. Arrows between replicas of section 1300 and cross-sections 1320-1340 identify the coordinate of the x-axis that links the two events in the t-x domain to corresponding points in the dip map at a particular point in time.

It can be seen that the two events represented by the solid and dashed lines in the t-x section have nearly the same dip, as shown with respect to the vertical axes of each of cross-sections 1320-1340. Cross-sections 1320 and 1340, corresponding to times $t_0$ and $t_2$, show the two events as being identifiably distinct, as shown by the two distinct arrows mapping the events to the dip map in each case.

At time $t_1$, however, it can be seen that the two events cross and thus coincide in the t-x domain, and likewise overlap in the dip map as shown in cross-section 1330. Because the events coincide, it is difficult to distinguish them on the basis of the data available at $t_1$. But it is noted that the illustrated events in section 1300 are continuous, thus constraining the set of possible values for the events at $t_1$. That is, the event data at $t_1$ cannot be simply any arbitrary value, but rather must respect the fact $t_1$ is one point of a continuous event between $t_0$ and $t_2$, and is therefore related to $t_0$ and $t_2$. Thus, even though the distinction between the two events at $t_1$ is ambiguous, the fact that the events are distinguishable at $t_0$ and $t_2$ coupled with the knowledge that all three points are part of a continuous process can be employed to help disambiguate the two events at $t_1$. That is, it is possible to infer information about one point in dip map 1310 (and, correspondingly, in the t-x domain) on the basis of neighboring points within the dip map, because dip map 1310 preserves the continuity of events in t-x section 1300.

This insight regarding the relationships between events in the t-x domain and coefficients in the transform domain, as represented by dip map 1310, gives rise to potential further improvements in denoising performance of techniques using directional transforms, such as the curvelet-based adaptive subtraction process discussed above with respect to FIGS. 1-9. For example, as described above with respect to FIG. 5, a noise template may be adapted prior to being combined with data, in order to improve the quality of the denoising produced by subtracting the noise template from the data. In a curvelet-based approach, the noise template adaptation may include respectively rotating and scaling the phase and amplitude of curvelet coefficients, e.g., based on a statistical analysis as described with respect to FIGS. 6-8.

However, this noise template adaptation process can potentially generate artifacts in certain circumstances. In particular, when noise events intersect with signal events (as at $t_1$ in FIG. 13), both events can be mapped to the same curvelet coefficients. When these coefficients are rotated and scaled during the adaptation process, this affects both the noise and signal events occurring at that point in the t-x domain. Adapting the curvelet coefficients to better predict noise may consequently reduce the fidelity of their representation of the signal event, causing damage to the signal. (Broadly speaking, "damage" refers to any reduction or impairment of the information conveyed by a signal, through the introduction of noise, distortion, or any other phenomenon that causes the signal to less accurately convey the information it originally encoded.)

Signal damage arising from the curvelet adaptation process may be reduced by not simply adapting curvelet coefficients in isolation, but taking into account nearby coefficients (e.g., within the space of one or more dip maps) in determining the extent to which adaptation should be performed. For example, as will be discussed in greater detail below, a dip map data structure may be employed during noise template adaptation in a manner that decreases a degree of adaptation in areas of recorded data where the dip map indicates that signal is dominant over noise, thereby reducing the likelihood of signal damage in areas of prominent signal. Conversely, an increased degree of adaptation may be employed in areas of recorded data where the dip map indicates that noise is dominant, thereby permitting more aggressive noise reduction in areas where signal damage is less likely to be consequential.

Figure 14:
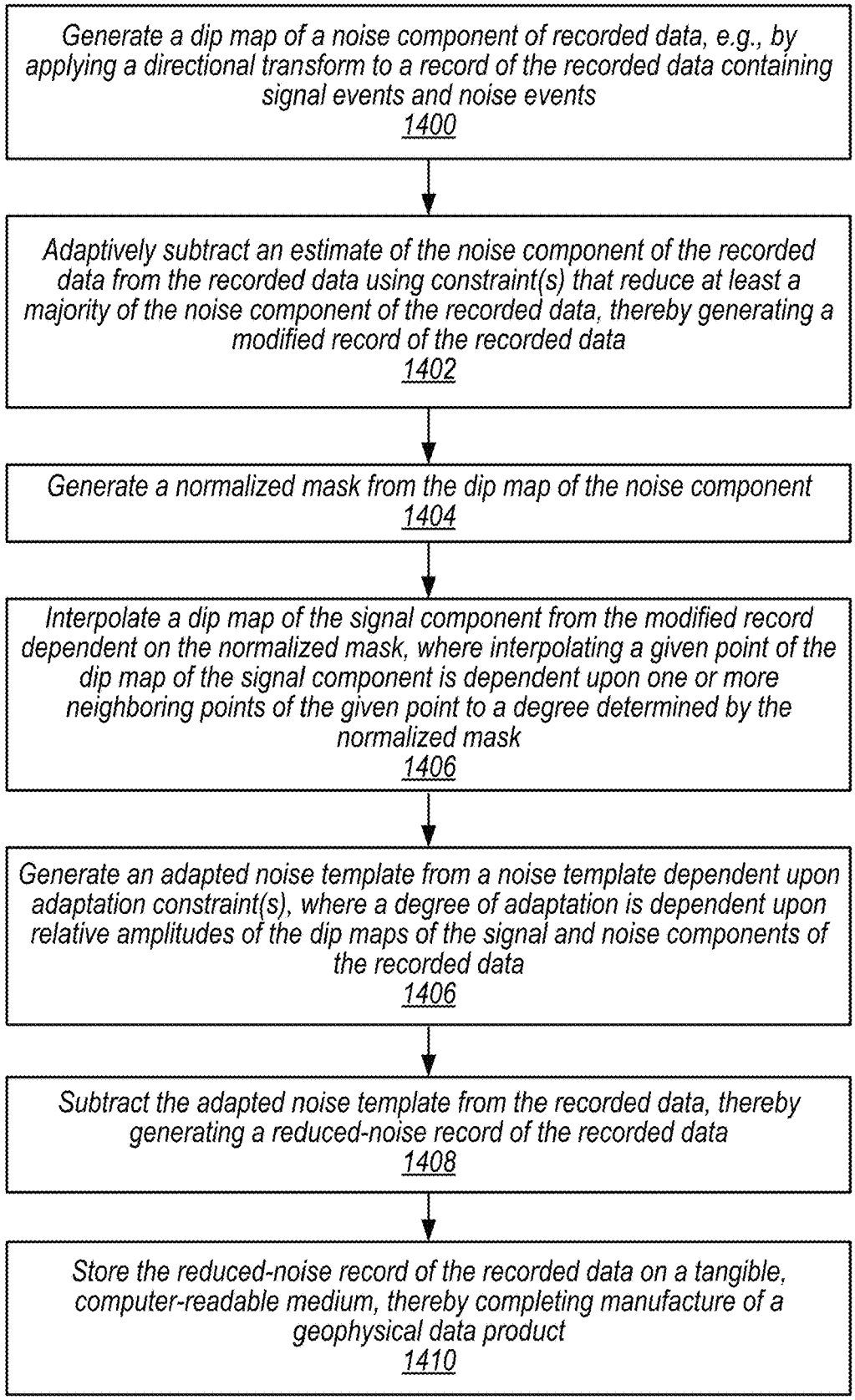
FIG. 14 shows a flow diagram that illustrates an embodiment of a method of using dip maps to control a degree of adaptation of a noise template during a denoising process.

One example of a method in which dip maps may be used to control a degree of adaptation of a noise template is shown in FIG. 14. FIG. 14 specifically refers to recorded data, it being noted that the illustrated method or a similar technique may be performed on seismic data or any suitable data set. Operation of FIG. 14 begins in block 1400 with generation of a dip map of a noise component of recorded data, e.g., by applying a directional transform to a record of the recorded data that contains both signal events and noise events. The resultant dip map may be denoted $D_N$. In some embodiments, a signal component of the recorded data may correspond to primary seismic reflections (i.e., events that are reflected once between a seismic source and a receiver), and a noise component of the recorded data may correspond to multiple seismic reflections (i.e., events that are reflected multiple times between a seismic source and a receiver).

Generating the dip map may be performed, e.g., according to the method of FIG. 12, or any suitable variant. In some embodiments, it may involve convolving the recorded data with a set of directional filters that is generated dependent upon frequency supports of a curvelet transform at a highest level of scale, e.g., as discussed above with respect to FIGS. 10-11. In some embodiments, a number of discrete directions that can be encoded in the dip map is equal to a number of directions of the curvelet transform at the highest level of scale. While complex curvelets are described extensively here, it is noted that in other embodiments, any suitable complex-valued, directional, multi-resolution (CDM) transform may be used.

At block 1402, an estimate of the noise component of the recorded data is adaptively subtracted from the recorded data using one or more constraints that reduce at least a majority of the noise component thereby generating a modified record of the recorded data. In some embodiments, the adaptive subtraction process used may be similar to that described above with respect to block 518 of FIG. 5, although a different process and/or different constraints may be used. Generally speaking, the constraints employed in this adaptive subtraction process should be selected so that most or all of the noise is removed and the result is mostly or entirely signal. As a result of such aggressive denoising, however, it is highly likely that some damage to the signal will occur. Accordingly, a likely (though not essential) consequence of adaptively subtracting to reduce at least a majority of the noise component is that at least a portion of a signal component of the recorded data will also be reduced, and that in the modified record, the signal component is at least partially damaged. It is noted, however, that the modified record is an intermediate element in a process of generating a dip map data structure that, as described below, may then be used to control noise template adaptation during denoising of recorded data. To the extent signal damage does occur during generation of the dip map, such damage does not propagate to the original record of recorded data that is denoised. That is, the modified record of recorded data that is employed during dip map generation is distinct from the record of recorded data that is operated on by, e.g., block 1408 discussed below.

At block 1404, a normalized mask is generated from the noise component dip map $D_N$. Generally speaking, generating the normalized mask involves proportionally scaling the values in the dip map so they occupy a defined range (e.g., from 0 to 1, although any suitable range could be employed) while retaining a defined relationship with one another (e.g., a linear relationship). For example, a normalized mask M(t, x d) may be generated by simply scaling each point in the dip map by the largest value in the dip map:

$$M(t, x, d) = \frac{D_N(t, x, d)}{\max(D_N(t, x, d))}$$

At block 1406, a dip map of the signal component $D_S$ is interpolated from the modified record dependent upon the normalized mask, where interpolating a given point of $D_S$ is dependent upon one or more neighboring points of the given point to a degree that is determined by the normalized mask. In some embodiments, the interpolating may include generating an initial estimate of $D_S$ from the modified record produced at block 1402, for example using dip map generation techniques similar to those used for generating $D_N$ as discussed with respect to block 1400. However, estimating $D_S$ may be performed separately from the interpolation.

It is noted that as used herein, the term "interpolating" and its variants refer to any adjustment, correction, weighting, or other manipulation or determination of a given data point dependent upon one or more neighboring values of the given data point. It is not necessary that the given data point be unknown prior to the interpolating, although this is permissible. Moreover, as used herein, "neighboring" refers to points that lie within a specified degree of proximity to the given point within a coordinate space. (In the context of performing a 2-dimensional subtraction with a 3-dimensional dip map, "neighboring" may refer to a defined, limited distance within the 3-dimensional coordinate space of the dip map.) Points that are adjacent to the given space within the coordinate space may constitute neighbors, but non-adjacent points may also constitute neighbors. For example, a distance metric or function may be employed to determine the extent of the "neighborhood" around the given point.

Generally speaking, interpolation of a given point of $D_S$ dependent upon normalized mask M(t, x d) may be implemented by using mask M(t, x d) to generate a weighted combination of two components: the given point of $D_S$ itself, and a combination of one or more points that neighbor the given point. Mathematically, this can be expressed as:

$$D_S^*(t,x,d) = (1-M(t,x,d))D_S(t,x,d) + M(t,x,d)\text{neighbors}(D_S(t,x,d))$$

where $D_S^*(t, x, d)$ denotes the interpolated result and neighbors( ) produces a composite value of one or more points neighboring the given point, depending upon the definition of the neighborhood.

Thus, for example, if the value of normalized mask M(t, x d) is relatively small at the given point, this may indicate that noise is less likely to mask the signal component at the given point. In this case, the value of the given point itself can serve as the majority contributor to the interpolated result. By contrast, if the value of normalized mask M(t, x d) is relatively large at the given point, this may indicate that noise is more likely to mask the signal component at the given point. In this case, the given point may be a minority contributor (or possibly a zero contributor) to the interpolated result, and the point(s) neighboring the given point would be the majority contributor.

One particular example of interpolation can be expressed as:

$$D_S^*(t, x, d) = (1 - M(t, x, d))D_S(t, x, d) + M(t, x, d)\sum_{t_i, x_j} W(t_i, x_j, d)\, D_S(t - t_i, x - x_j, d)$$

In this example, the neighborhood is defined by taking i points along the t-axis and j points along the x-axis of the dip map relative to the given point and combining them. $W(t_i, x_j, d)$ denotes an anisotropic smoothing window having a main axis in the direction of current dip d, where the value of $W(t_i, x_j, d)$ is estimated from $1-M(t_i, x_j, d)$ and normalized so that the sum of $W(t_i, x_j, d)$ equals 1.

At this point, respective noise and signal dip maps $D_N$ and $D_S$ have been generated. These dip maps may be used to control the degree of adaptation of a directional transform in a denoising process such as the curvelet adaptation process discussed above with respect to FIGS. 5-9. In particular, at block 1406, an adapted noise template is generated from a noise template dependent upon a set of adaptation constraints, where the degree of adaptation (e.g., at a given point) is dependent upon relative amplitudes of the dip maps of the signal and noise components of the recorded data. In some embodiments, for a given subband of the adapted noise template, the set of adaptation constraints includes rotation of a phase of a coefficient corresponding to the subband, as well as scaling of an amplitude of that coefficient.

For example, generation of an adapted noise template occurs at blocks 514 and 516 of FIG. 5, as discussed above, and may include determining a degree of rotation and scaling of curvelet coefficients based on statistical methods, as discussed with respect to FIGS. 6-8. In some embodiments, the operation of block 1406 may be employed within the context of the noise template adaptation of FIG. 5 (although it may be employed within other suitable denoising flows as well). For example, the relative amplitudes of the dip maps $D_N$ and $D_S$ may be used to control the degree of rotation and scaling that is applied to curvelet coefficients: if the amplitude of noise dip map $D_N$ is higher than signal dip map $D_S$ for a given coefficient having particular t, x, and j coordinates, the level of adaptation may be increased (e.g., by scaling the degree of adaptation by the magnitude of the ratio of the dip map amplitudes, or according to another suitable technique). By contrast, if the signal dip map amplitude is higher than the noise dip map, the level of adaptation may be decreased. In this manner, decreasing adaptation in areas where the dip map indicates that signal predominates may help to better preserve signal events, whereas increasing adaptation where noise predominates may help remove more noise in areas where the signal is relatively weak.

At block 1408, the adapted noise template is subtracted from the recorded data, thereby generating a reduced-noise record of the recorded data. For example, after the noise template has been adapted in accordance with the signal and noise dip maps as described with respect to block 1406, the adapted template may be subtracted as described above with respect to block 518 of FIG. 5, or using any other suitable technique for combining the adapted noise template with seismic or other recorded data.

At block 1410, the reduced-noise record of the recorded data is stored on a tangible, computer-readable medium, thereby completing the manufacture of a geophysical data product. For example, the resulting record may be persistently stored to generate a geophysical data product as discussed above with respect to FIG. 1. In some embodiments, however, it is noted that additional analysis may be performed on the noise-reduced record of the recorded data before the data is stored on the computer-readable medium. In other embodiments, block 1410 may be omitted and the noise-reduced record may be passed to other analysis flows or displayed without being stored in this fashion.

Figure 15:
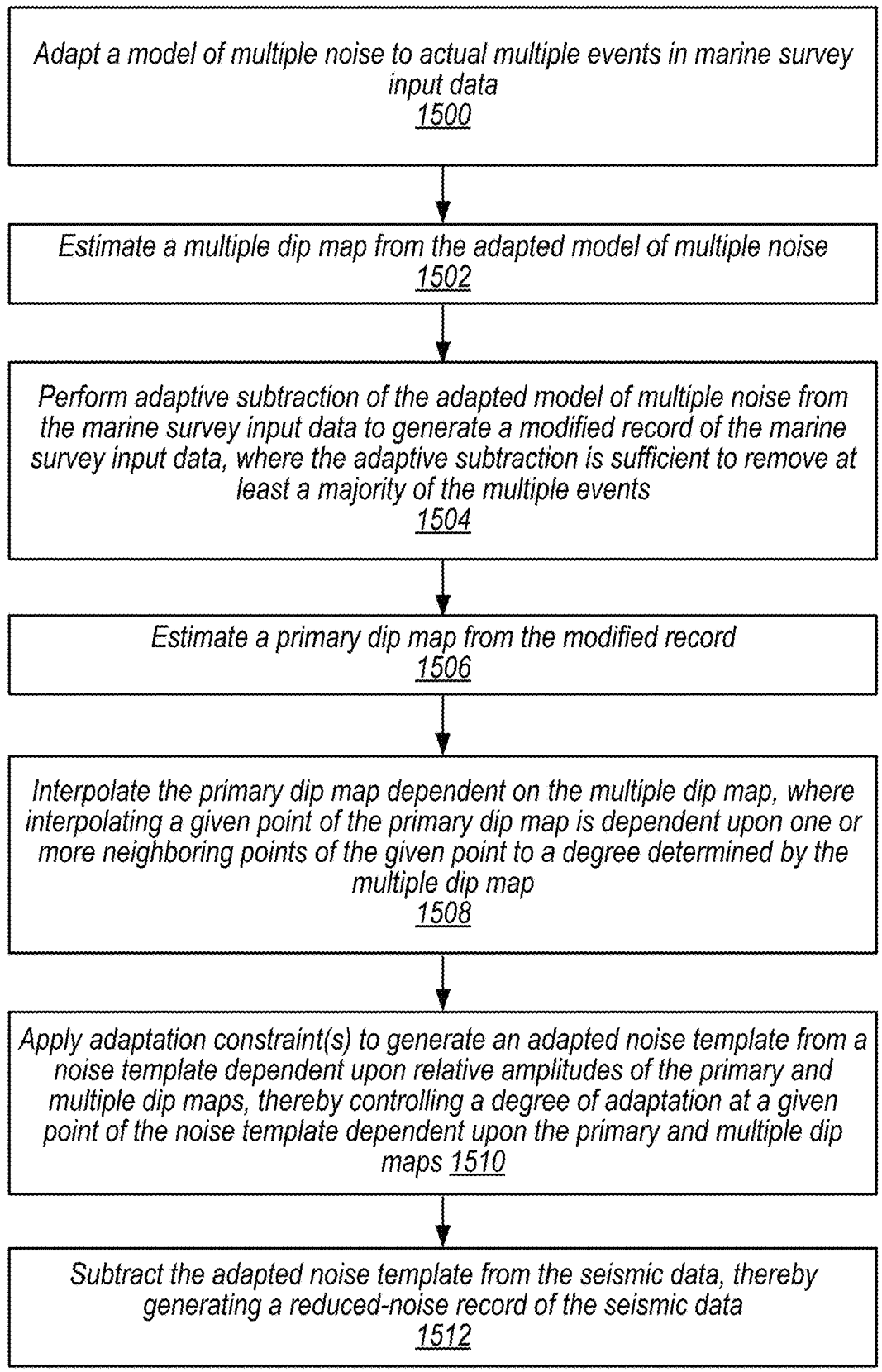
FIG. 15 shows a flow diagram that illustrates an embodiment of a method for generating reduced-noise marine survey data by reducing multiple noise using dip maps.

FIG. 15 illustrates an embodiment of a method for generating reduced-noise marine survey data by reducing multiple noise using dip maps. Operation begins in block 1500 with adaptation of a model of multiple noise to actual multiple events in marine survey input data, where the marine survey input data includes records of primary events and multiple events. Noise models were discussed extensively in a previous section, which applies equally here. Generally speaking, the adaptation of the noise model may operate to reduce a difference between the model and seismic survey data.

In some embodiments, adapting the model of multiple noise includes applying a least squares fitting process that attempts to minimize a sum of squared residuals between the model and the marine survey input data. An iterative least squares fitting process is one example of a means for adapting a model of multiple noise to seismic data. In general, such means include iterative processes that assign weights to an objective function, evaluate the objective function with respect to a convergence criterion, and if the criterion is not met, adjust or perturb the weights and reevaluate the objective function. Other suitable means include, e.g., multiple subtraction using a curvelet transform, either by thresholding based on the amplitude of the curvelet coefficients of both the data and the multiple model, or by performing pairwise phase rotation and amplitude scaling of the model and data complex curvelet coefficients (such as described above).

At block 1502, a multiple dip map is estimated from the adapted model of multiple noise. In some embodiments, estimating (or, alternatively, generating) the multiple dip map may include convolving the adapted model of multiple noise with a set of directional filters, such as directional filters generated upon frequency supports of a curvelet transform at a highest level of scale. The method of FIG. 12, or other suitable techniques, may be employed for estimating the multiple dip map.

At block 1504, adaptive subtraction of the adapted model of multiple noise from the marine survey input data is performed to generate a modified record of the marine survey data. The adaptive subtraction is sufficient to remove at least a majority of the multiple events. For example, similar to the discussion above of block 1402 of FIG. 14, the adapted model may be applied using aggressive adaptation constraints that remove most or all of the multiple noise. As described with respect to block 1402, aggressive denoising may be likely to also damage primary events in the resulting modified record. Examples of means for subtracting the adapted model from multiple noise include pointwise subtraction and adaptive subtraction, as described with respect to block 518.

At block 1506, a primary dip map is estimated from the modified record. For example, the modified record may be convolved with a set of directional filters in a manner similar to that discussed with respect to block 1502. As discussed above, in some embodiments, the primary dip map may be a three-dimensional data structure having time, space, and dip dimensions. A particular location within the three-dimensional data structure (e.g., as defined by particular coordinates of the time, space, and dip dimensions) may store a dip spectrum vector corresponding to one or more seismic events at that particular location.

At block 1508, the primary dip map is interpolated dependent upon the multiple dip map, where interpolating a given point of the primary dip map is dependent upon one or more neighboring points of the given point to a degree determined by the multiple dip map. The interpolating may include compensating for multiple masking of a primary event within the marine survey input data. For example, prior to the interpolating, the given point within the primary dip map may encode two or more seismic events that overlap in the space and dip dimensions (e.g., as shown at $t_1$ of FIG. 13, where a signal event and a noise event intersect in the t-x domain). The process of interpolating, as discussed with respect to FIG. 14, may facilitate the separation of the two or more overlapping seismic events.

In some embodiments, the interpolating may be performed dependent upon estimating a normalized mask from the multiple dip map, for example as discussed above with respect to block 1404 of FIG. 14. Also, in some embodiments, interpolating the primary dip map at a given point having a current dip includes applying an anisotropic smoothing window having a main axis in a direction of the current dip, for example as discussed above with respect to block 1406 of FIG. 14.

Generally speaking, the interpolating at block 1508 may include generating a weighted combination of the given point of the primary dip map and the one or more neighboring points. For example, the normalized mask may be used along with the techniques discussed above with respect to block 1406 of FIG. 14, or suitable variants thereof, to generate such a weighted combination.

In some embodiments, block 1506-1508 taken together, with the several variations described above (e.g., use of a normalized mask and/or manner of generating a weighted combination), constitute examples of means for generating a primary dip map dependent upon a multiple dip map.

At block 1510, one or more adaptation constraints are applied to generate an adapted noise template from a noise template dependent upon relative amplitudes of the primary and multiple dip maps, thereby controlling a degree of adaptation at a given point of the noise template dependent upon the primary and multiple dip maps. In some embodiments, the degree of adaptation at the given point is reduced dependent upon a degree to which an amplitude of the primary dip map exceeds an amplitude of the multiple dip map, thereby improving preservation of primary events. In other instances, the degree of adaptation at the given point is increased dependent upon a degree to which an amplitude of the multiple dip map exceeds an amplitude of the primary dip map, thereby improving attenuation of multiple events in areas where primary events are weak.

At block 1512, the adapted noise template is subtracted from the seismic data, thereby generating a reduced-noise record of the seismic data. For example, similarly to block 1408 of FIG. 14, the adapted noise template may be subtracted as described above with respect to block 518 of FIG. 5, or using any other suitable technique for combining the adapted noise template with seismic data. In some embodiments, the resulting reduced-noise record may be stored to a tangible, computer-readable medium to complete the manufacture of a geophysical data product (not shown in FIG. 15). In some embodiments, blocks 1510-1512 taken together, with the variations described above, constitute examples of means for performing adaptive subtraction of an adapted noise template from seismic data dependent upon the multiple dip map and the primary dip map, thereby generating denoised seismic data.

As discussed above, the techniques of FIGS. 14-15, or suitable variants thereof, may be deployed within the overall denoising process described with respect to FIGS. 1-9. For example, dip map generation may be performed as an additional workflow during the process of noise template adaptation, prior to subtraction of the noise template at block 518 of FIG. 5. In other embodiments, however, the dip map techniques described with respect to FIGS. 10-15 may be deployed independently of FIGS. 1-9, or within another suitable analysis flow.

Example Computing System

Various operations described herein may be implemented by a computing device configured to execute program instructions that specify the operations. Similarly, various operations may be performed by circuitry designed or configured to perform the operations. In some embodiments, a non-transitory computer-readable medium has program instructions stored thereon that are capable of causing various operations described herein. As used herein, the term "processor," "processing unit," or "processing element" refers to various elements or combinations of elements configured to execute program instructions. Processing elements include, for example, circuits such as an ASIC (Application Specific Integrated Circuit), custom processing circuits or gate arrays, portions or circuits of individual processor cores, entire processor cores, individual processors, programmable hardware devices such as a field programmable gate array (FPGA) or the like, and/or larger portions of systems that include multiple processors, as well as any combinations thereof.

Figure 16:
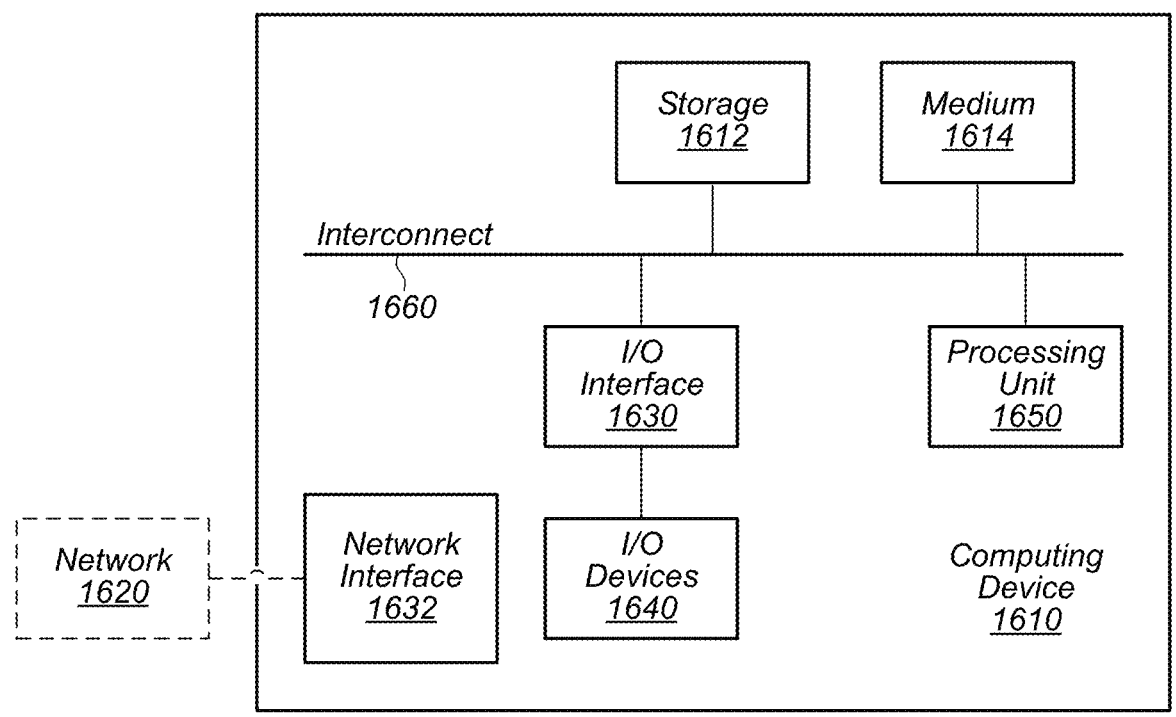
FIG. 16 shows a block diagram illustrating an example computing system.

Turning now to FIG. 16, a block diagram of a computing device (which may also be referred to as a computing system) 1610 is depicted, according to some embodiments. Computing device 1610 may be used to implement various portions of this disclosure. Computing device 1610 is one example of a device that may be used as a mobile device, a server computing system, a client computing system, or any other computing system implementing portions of this disclosure.

Computing device 1610 may be any suitable type of device, including, but not limited to, a personal computer system, desktop computer, laptop or notebook computer, mobile phone, mainframe computer system, web server, workstation, or network computer. As shown, computing device 1610 includes processing unit 1650, storage subsystem 1612, and input/output (I/O) interface 1630 coupled via interconnect 1660 (e.g., a system bus). I/O interface 1630 may be coupled to one or more I/O devices 1640. Computing device 1610 further includes network interface 1632, which may be coupled to network 1620 for communications with, for example, other computing devices.

As described above, processing unit 1650 includes one or more processors. In some embodiments, processing unit 1650 includes one or more coprocessor units. In some embodiments, multiple instances of processing unit 1650 may be coupled to interconnect 1660. Processing unit 1650 (or each processor within processing unit 1650) may contain a cache or other form of on-board memory. In some embodiments, processing unit 1650 may be implemented as a general-purpose processing unit, and in other embodiments it may be implemented as a special purpose processing unit (e.g., an ASIC). In general, computing device 1610 is not limited to any particular type of processing unit or processor subsystem.

Storage subsystem 1612 is usable by processing unit 1650 (e.g., to store instructions executable by and data used by processing unit 1650). Storage subsystem 1612 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 1612 may consist solely of volatile memory in some embodiments. Storage subsystem 1612 may store program instructions executable by computing device 1610 using processing unit 1650, including program instructions executable to cause computing device 1610 to implement the various techniques disclosed herein. In at least some embodiments, storage subsystem 1612 may represent an example of a non-transitory computer-readable medium that may store executable instructions.

In the illustrated embodiment, computing device 1610 further includes non-transitory medium 1614 as a possibly distinct element from storage subsystem 1612. For example, non-transitory medium 1614 may include persistent, tangible storage such as disk, nonvolatile memory, tape, optical media, holographic media, or other suitable types of storage. In some embodiments, non-transitory medium 1614 may be employed to store and transfer geophysical data, and may be physically separable from computing device 1610 to facilitate transport. Accordingly, in some embodiments, the geophysical data product discussed above may be embodied in non-transitory medium 1614. Although shown to be distinct from storage subsystem 1612, in some embodiments, non-transitory medium 1614 may be integrated within storage subsystem 1612.

I/O interface 1630 may represent one or more interfaces and may be any of various types of interfaces configured to couple to and communicate with other devices, according to various embodiments. In some embodiments, I/O interface 1630 is a bridge chip from a front-side to one or more back-side buses. I/O interface 1630 may be coupled to one or more I/O devices 1640 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.). In some embodiments, the geophysical data product discussed above may be embodied within one or more of I/O devices 1640.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. An "apparatus configured to traverse a streamer" is intended to cover, for example, a mechanism that performs this function during operation, even if the mechanism in question is not currently being used (e.g., a power supply is not connected to it, or no streamer is currently present). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function, and may, after programming, be "configured to" perform that function.

Reciting in the appended claims that a structure is "configured to" perform one or more tasks is expressly intended not to invoke 35 U.S.C. § 112(f) for that claim element. Only those claims expressly using the "means for [performing a function]" construct are intended to invoke Section 112(f) for that claim element.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents (such as "one or more" or "at least one") unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Moreover, where flow charts or flow diagrams are used to illustrate methods of operation, it is specifically contemplated that the illustrated operations and their ordering demonstrate only possible implementations and are not intended to limit the scope of the claims. It is noted that alternative implementations that include more or fewer operations, or operations performed in a different order than shown, are possible and contemplated.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure. Although various advantages of this disclosure have been described, any particular embodiment may incorporate some, all, or even none of such advantages.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims, and features from respective independent claims may be combined in any appropriate manner and not merely in the specific combinations enumerated in the appended claims.

What is claimed is:

1. A non-transitory machine-readable medium that stores instructions, wherein the instructions are executable by one or more processors to manufacture a geophysical data product by performing operations comprising:
   generating a dip map of a noise component of recorded data, wherein generating the dip map includes applying a directional transform to a record of the recorded data containing both signal events and noise events;

adaptively subtracting an estimate of the noise component of the recorded data from the recorded data using one or more constraints that reduce at least a majority of the noise component, thereby generating a modified record of the recorded data;

generating a normalized mask from the dip map of the noise component of the recorded data;

interpolating a dip map of the signal component of the recorded data from the modified record dependent upon the normalized mask, wherein interpolating a given point of the dip map of the signal component is dependent upon one or more neighboring points of the given point to a degree determined by the normalized mask;

generating an adapted noise template from a noise template dependent upon a set of adaptation constraints, wherein the noise template is indicative of predicted noise in the recorded data, and wherein a degree of adaptation of the adapted noise template is dependent upon relative amplitudes of the dip maps of the signal component and the noise component of the recorded data;

subtracting the adapted noise template from the recorded data, thereby generating a reduced-noise record of the recorded data; and storing the reduced-noise record of the recorded data on a tangible, computer-readable medium, thereby completing the manufacturing of the geophysical data product.

2. The non-transitory machine-readable medium of claim 1, wherein the signal component of the recorded data corresponds to primary seismic reflections, and wherein the noise component of the recorded data corresponds to multiple seismic reflections.

3. The non-transitory machine-readable medium of claim 1, wherein the directional transform is a complex-valued, directional, multi-resolution (CDM) transform.

4. The non-transitory machine-readable medium of claim 3, wherein the CDM transform comprises a complex curvelet transform.

5. The non-transitory machine-readable medium of claim 1, wherein applying the directional transform to generate the dip map of the noise component comprises convolving the recorded data with a set of directional filters, wherein the set of directional filters is generated dependent upon frequency supports of a curvelet transform at a highest level of scale.

6. The non-transitory machine-readable medium of claim 5, wherein a number of discrete directions that can be encoded in the dip map is equal to a number of directions of the curvelet transform at the highest level of scale.

7. The non-transitory machine-readable medium of claim 1, wherein for a given subband of the adapted noise template, the set of adaptation constraints includes rotation of a phase of a coefficient corresponding to the subband and scaling of an amplitude of the coefficient.

8. The non-transitory machine-readable medium of claim 1, wherein adaptively subtracting the estimate of the noise component to reduce at least the majority of the noise component causes a signal component of the recorded data to be at least partially damaged in the modified record.

9. In a technological method of generating reduced-noise marine survey data that includes:

generating, using a curvelet transform, transformed marine survey data from marine survey input data represented in an input domain, wherein the marine survey input data includes geophysical data indicative of geological structure, and wherein the marine survey input data contains noise;

generating, using the curvelet transform, a transformed noise template from an input noise template, wherein the input noise template is indicative of predicted noise in the marine survey input data;

applying a set of adaptation constraints to the transformed noise template to generate an adapted transformed noise template;

removing noise from the transformed marine survey data using the adapted transformed noise template; and subsequent to noise removal, performing an inverse curvelet transform on the transformed marine survey data to generate reduced-noise marine survey data in the input domain;

the specific improvement comprising:

adapting a model of multiple noise to actual multiple events in the marine survey input data;

estimating a multiple dip map from the adapted model of multiple noise;

performing adaptive subtraction of the adapted model of multiple noise from the marine survey input data to generate a modified record of the marine survey input data, wherein the adaptive subtraction is sufficient to remove at least a majority of the multiple events;

estimating a primary dip map from the modified record; and interpolating the primary dip map dependent upon the multiple dip map, wherein interpolating a given point of the primary dip map is dependent one or more neighboring points of the given point to a degree determined by the multiple dip map;

wherein applying the set of adaptation constraints is performed dependent on relative amplitudes of the primary dip map and the multiple dip map, thereby controlling a degree of adaptation at a given point of the transformed noise template dependent upon the primary dip map and the multiple dip map, and thereby improving the removing of noise from the transformed survey data.

10. The technological method of claim 9, wherein at the given point, the degree of adaptation is reduced dependent upon a degree to which an amplitude of the primary dip map exceeds an amplitude of the multiple dip map, thereby improving preservation of primary events.

11. The technological method of claim 9, wherein at the given point, the degree of adaptation is increased dependent upon a degree to which an amplitude of the multiple dip map exceeds an amplitude of the primary dip map, thereby improving attenuation of multiple events in areas where primary events are weak.

12. The technological method of claim 9, wherein estimating the multiple dip map includes convolving the model of multiple noise with a set of directional filters, wherein the set of directional filters is generated dependent upon frequency supports of a curvelet transform at a highest level of scale.

13. The technological method of claim 12, wherein estimating the multiple dip map further includes taking an absolute value of an output of the convolving and applying a smoothing window prior to generating a three-dimensional data structure indicative of the multiple dip map.

14. The technological method of claim 9, wherein the improvement further comprises estimating a normalized mask from the multiple dip map, wherein the interpolating is performed dependent upon the normalized mask.

15. The technological method of claim 9, wherein interpolating the primary dip map at a given point having a current dip includes applying an anisotropic smoothing window having a main axis in a direction of the current dip.

16. The technological method of claim 9, wherein interpolating the primary dip map includes compensating for multiple masking of a primary event within the marine survey input data.

17. The technological method of claim 9, wherein adapting the model of multiple noise includes applying a least squares fitting process that attempts to minimize a sum of squared residuals between the model and the marine survey input data.

18. The technological method of claim 9, wherein the adaptive subtraction also damages at least some one primary event in the marine survey input data.

19. A system, comprising:
a memory that stores instructions; and
one or more processors configured to execute the instructions to perform operations that implement denoising of seismic data, the operations including:
adapting a model of multiple noise to seismic data, thereby reducing a difference between the model and the seismic data, wherein the seismic data includes records of multiple events and primary events;
generating a multiple dip map by convolving the adapted model of multiple noise with a set of directional filters;
adaptively subtracting the adapted model of multiple noise from the seismic data to generate a modified record of the seismic data, wherein the adaptive subtraction is sufficient to remove at least a majority of the multiple events;
determining a primary dip map from the modified record, wherein the determining includes interpolating the primary dip map dependent on the multiple dip map, thereby compensating for primary events that are masked by multiple events;
performing adaptive subtraction of a noise template from the seismic data, thereby generating denoised seismic data, wherein prior to the adaptive subtraction, the noise template is adapted to the seismic data by a degree of adaptation that is determined dependent upon relative amplitudes of the primary dip map and the multiple dip map.

20. The system of claim 19, wherein the primary dip map is a three-dimensional data structure having time, space, and dip dimensions, and wherein a particular location within the three-dimensional data structure stores a dip spectrum vector corresponding to one or more seismic events at the particular location.

21. The system of claim 20, wherein prior to interpolating, the particular location within the primary dip map encodes two or more seismic events overlapping in the space and dip dimensions.

22. The system of claim 21, wherein interpolating the primary dip map facilitates separation of the two or more seismic events.

23. An apparatus for denoising seismic data, comprising:
one or more computer systems having program storage and processing hardware, wherein the processing hardware is operable to execute instructions stored in the program storage to implement:
means for adapting a model of multiple noise to seismic data;
means for generating a multiple dip map from the adapted model of multiple noise;
means for subtracting the adapted model of multiple noise from the seismic data;
means for generating a primary dip map dependent upon the multiple dip map; and
means for performing adaptive subtraction of an adapted noise template from the seismic data dependent upon the multiple dip map and the primary dip map, thereby generating denoised seismic data.

24. The apparatus of claim 23, wherein the means for adapting the model of multiple noise to seismic data includes performing a least squares fitting process that iteratively attempts to minimize a sum of squared residuals between the model of multiple noise and the seismic data.

25. The apparatus of claim 23, wherein the means for generating the multiple dip map includes convolving the seismic data with a set of directional filters, wherein the set of directional filters is generated dependent upon frequency supports of a curvelet transform at a highest level of scale.

26. The apparatus of claim 23, wherein the means for subtracting the adapted model of multiple noise includes adaptively subtracting the adapted model of multiple noise from the seismic data to generate a modified record of the seismic data, wherein the adaptive subtraction is sufficient to remove at least a majority of multiple events in the seismic data, and wherein the adaptive subtraction also damages at least one primary event in the seismic data.

27. The apparatus of claim 26, wherein the means for generating the primary dip map includes determining the primary dip map from the modified record, wherein the determining includes interpolating the primary dip map dependent on the multiple dip map, thereby compensating for primary events that are masked by multiple events.

* * * * *